(12) United States Patent
Miyazaki et al.

(10) Patent No.: US 6,862,101 B1
(45) Date of Patent: Mar. 1, 2005

(54) IMAGE PROCESSING APPARATUS, METHOD FOR ADDING OR UPDATING SEQUENCE OF IMAGE PROCESSING AND DATA FOR IMAGE PROCESSING IN THE IMAGE PROCESSING APPARATUS, AND COMPUTER-READABLE RECORDING MEDIUM WHERE PROGRAM FOR MAKING COMPUTER EXECUTE THE METHOD IS RECORDED

(75) Inventors: Hideto Miyazaki, Tokyo (JP); Yoshiyuki Namizuka, Tokyo (JP); Yuji Takahashi, Tokyo (JP); Yasuyuki Nomizu, Tokyo (JP); Hiroyuki Kawamoto, Tokyo (JP); Sugitaka Oteki, Tokyo (JP); Takako Satoh, Tokyo (JP); Rie Ishii, Tokyo (JP); Shinya Miyazaki, Tokyo (JP); Hiroaki Fukuda, Tokyo (JP); Fumio Yoshizawa, Tokyo (JP); Takeharu Tone, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 890 days.

(21) Appl. No.: 09/654,050

(22) Filed: Sep. 1, 2000

(30) Foreign Application Priority Data

Sep. 2, 1999 (JP) ............................................. 11-248307

(51) Int. Cl.⁷ ............................................. G06F 15/00
(52) U.S. Cl. .................... 358/1.13; 358/1.14; 358/1.15; 358/1.16
(58) Field of Search ...................... 358/1.13, 1.14–1.16, 358/534, 444, 462; 382/199, 177, 254

(56) References Cited

U.S. PATENT DOCUMENTS

| 5,050,221 A | 9/1991 | Ohta et al. .................. 382/177 |
| 5,410,619 A | 4/1995 | Fujisawa et al. ............ 382/254 |
| 6,041,139 A | 3/2000 | Okubo et al. ............... 382/199 |

FOREIGN PATENT DOCUMENTS

| JP | 6-237330 | 8/1994 |
| JP | 9-091129 | 4/1997 |

*Primary Examiner*—Twyler Lamb
(74) *Attorney, Agent, or Firm*—Oblon, Spivak, McClelland, Maier & Neustadt, P.C.

(57) ABSTRACT

An image processor has a transfer control section that transfers a sequence of image processing and data for image processing to be added or updated from a host buffer to program RAM and data RAM. The host buffer receives the sequence of image processing and data for image processing to be added or updated transferred from a process controller, and temporarily stores the sequence and the data during idle cycle time that a processor array section does not execute image processing. The transfer control section provides controls for transfer so that the sequence of image processing and data for image processing to be added or updated are split into blocks for a plurality of transfer times, and the blocks are transferred from the host buffer to the program RAM and the data RAM.

14 Claims, 21 Drawing Sheets

COLUMN
j-2  j-1  j  j+1  j+2

| | j-2 | j-1 | j | j+1 | j+2 |
|---|---|---|---|---|---|
| i-2 | A | B | C | D | E |
| i-1 | F | G | H | I | J |
| ROW i | K | L | M | N | O |
| i+1 | P | Q | R | S | T |
| i+2 | U | V | W | X | Y |

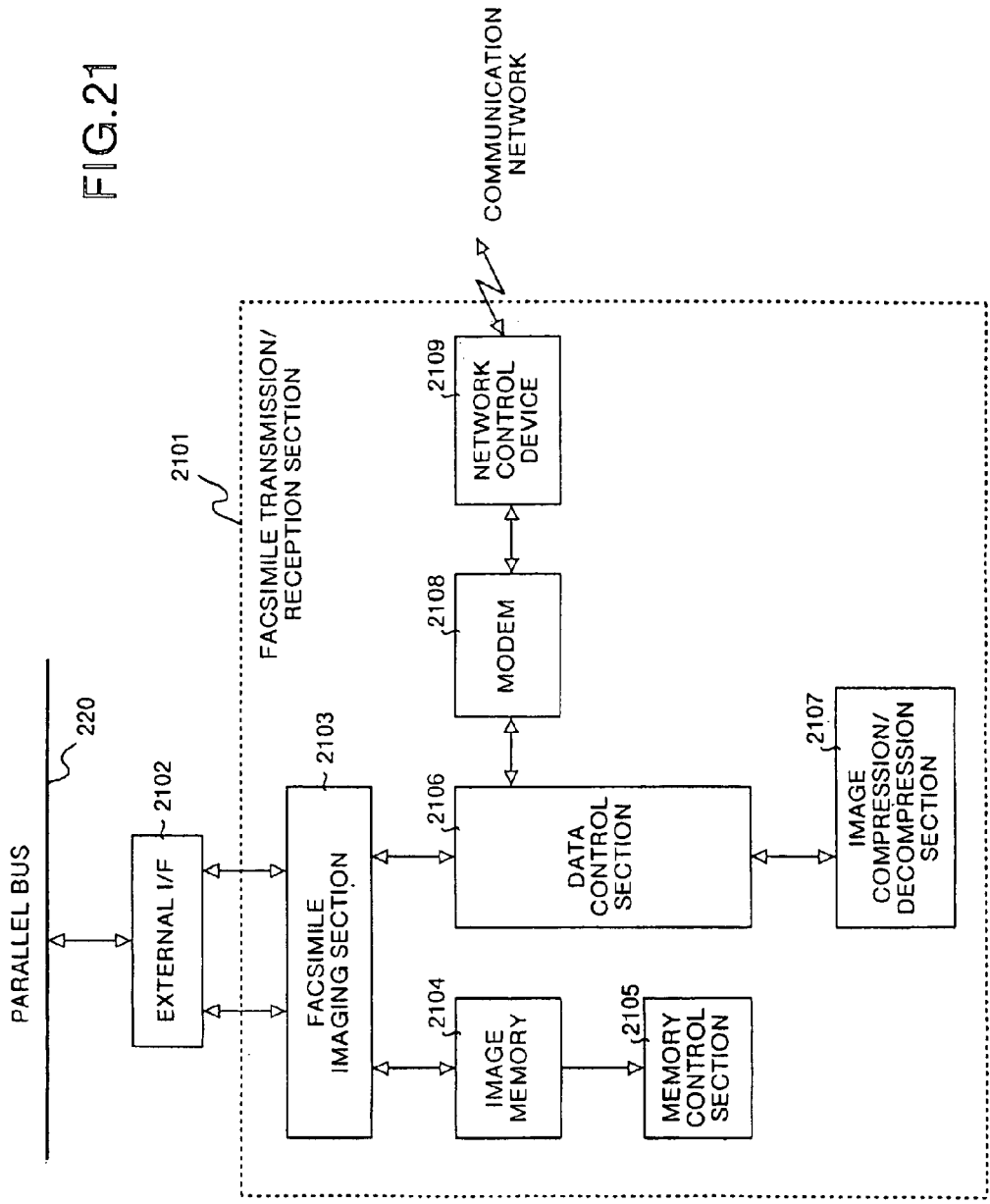

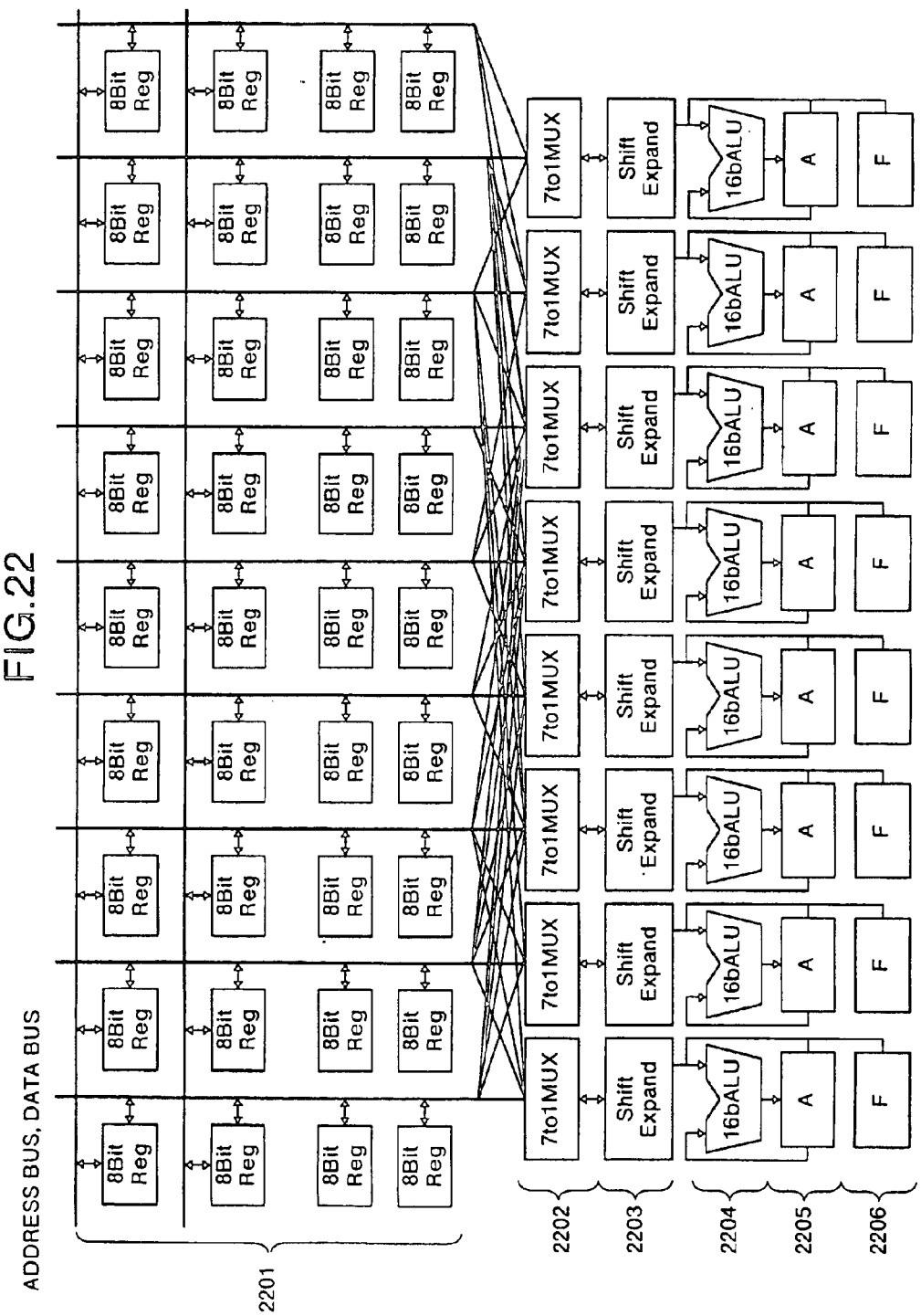

IMAGE PROCESSING APPARATUS, METHOD FOR ADDING OR UPDATING SEQUENCE OF IMAGE PROCESSING AND DATA FOR IMAGE PROCESSING IN THE IMAGE PROCESSING APPARATUS, AND COMPUTER-READABLE RECORDING MEDIUM WHERE PROGRAM FOR MAKING COMPUTER EXECUTE THE METHOD IS RECORDED

FIELD OF THE INVENTION

The present invention relates to an image processing apparatus that performs image processing on digital image data, particularly, on image data for a digital multifunction machine that combines functions of a copier, a facsimile, a printer, and a scanner, or the like into one. Further, this invention also relates to a method for adding or updating a sequence of image processing and data for image processing in the image processing apparatus, and a computer-readable recording medium where a program for making a computer execute the method is recorded.

BACKGROUND OF THE INVENTION

A digital copier that performs processing on digitized image data appeared on the market following an analog copier, and further, there is a digital multifunction machine formed by combining functions of a facsimile, a printer, and a scanner with the function of the digital copier.

As a management system of such an image processing apparatus, there is one that determines that an image processing apparatus is in a state of not working, and performs download, or upload at the most suitable time excluding the highest possible time to be used, as disclosed in JP, HEI 06-237330 A.

There is another one, as disclosed in JP, HEI 09-911291 A, that determines whether a program to be rewritten does not exert an influence onto the operation of an image processing apparatus even during its operation when the program of the apparatus is to be upgraded. If it is determined that the operation is not affected, the system rewrites the program, and if it is determined that the operation is affected, the system puts rewriting on hold until the operation is finished.

In the management system disclosed in JP, HEI 06-237330 A, however, the execution of alteration of or addition to a program is limited to a state where the image processing apparatus is not working. Accordingly, it is impossible to provide an image processing apparatus with high efficiency and availability. Thus, alteration of or addition to the program can not be executed immediately when it is required.

Further, in the management system disclosed in JP, HEI 09-91129 A, its main purpose is upgrade of a program. Therefore, if the program is rewritable, rewriting is performed. However, if rewriting is not allowed, some system puts rewriting on hold, which is quite impossible to enhance the efficiency of parallel operation of the image processing apparatus. Accordingly, more efficiency of the operation is needed to provide an image processing apparatus with high efficiency and availability.

SUMMARY OF THE INVENTION

It is an object of this invention to provide an image processing apparatus with high efficiency and availability that efficiently performs alteration of or addition to a program immediately when it is required without interruption of the primary operation of the image processing apparatus. The object of this invention is also to provide a method for adding or updating a sequence of image processing and data for image processing in the image processing apparatus, and to provide a computer-readable recording medium where a program for making a computer execute the method is recorded.

According to one aspect of this invention, during idle cycle time that an image processing section does not execute image processing, a transfer control section splits a sequence of image processing and data for image processing to be added or updated into blocks for a plurality of transfer times, and transfers the blocks from the third storage section to the second storage section.

Further, during the idle cycle time that the image processing section does not execute image processing, the transfer control section splits the sequence of image processing and data for image processing to be added or updated into blocks for a plurality of transfer times each by a predetermined number of pieces of data to be transferred for one time, and transfers the blocks from the third storage section to the second storage section.

Further, a set value of the number of pieces of data to be transferred for one time is included in data downloaded from the external microprocessor into the third storage section, and is set according to the length of idle cycle time determined based on the ability of the image processing section to perform image processing.

Further, an image processing unit is formed with an SIMD type of processor to perform image processing based on a high-speed computation of the SIMD type of processor.

According to another aspect of this invention, a sequence of image processing and data for image processing to be added or updated are split into blocks for a plurality of transfer times, and the blocks are transferred from a third storage section to a second storage section during idle cycle time that an image processing section does not execute image processing.

Further, the sequence of image processing and data for image processing to be added or updated are split into blocks for a plurality of transfer times each by a predetermined number of pieces of data to be transferred for one time, and the blocks are transferred from the third storage section to the second storage section during the idle cycle time that the image processing section does not execute image processing.

Further, a set value of the number of pieces of data to be transferred for one time is included in data downloaded from the external microprocessor into the third storage section, and is set according to the length of idle cycle time determined based on the ability of the image processing section to perform image processing.

According to still another aspect of this invention, a program which makes a computer execute the method according to the invention is recorded in a recording medium, which allows the program to be machine-readable. Accordingly, the method according to the invention can be executed by a computer.

Other objects and features of this invention will become understood from the following description with reference to the accompanying drawings.

Other objects and features of this invention will become understood from the following description with reference to the accompanying drawings.

BRIEF DESCRIPTION OF THE DRAWINGS

FIG. 21 is a block diagram showing a configuration of a facsimile control unit in the image processing apparatus according to the embodiment; and FIG. 22 schematically shows a configuration of an SIMD type of processor used in the image processing apparatus according to the embodiment.

DESCRIPTION OF THE PREFERRED EMBODIMENT

A preferred embodiment of the image processing apparatus, the method for adding or updating a sequence of image processing and data for image processing in the image processing apparatus, and the computer-readable recording medium where a program for making a computer execute the method is recorded according to this invention is explained blow with reference to the attached drawings.

Figure 1:
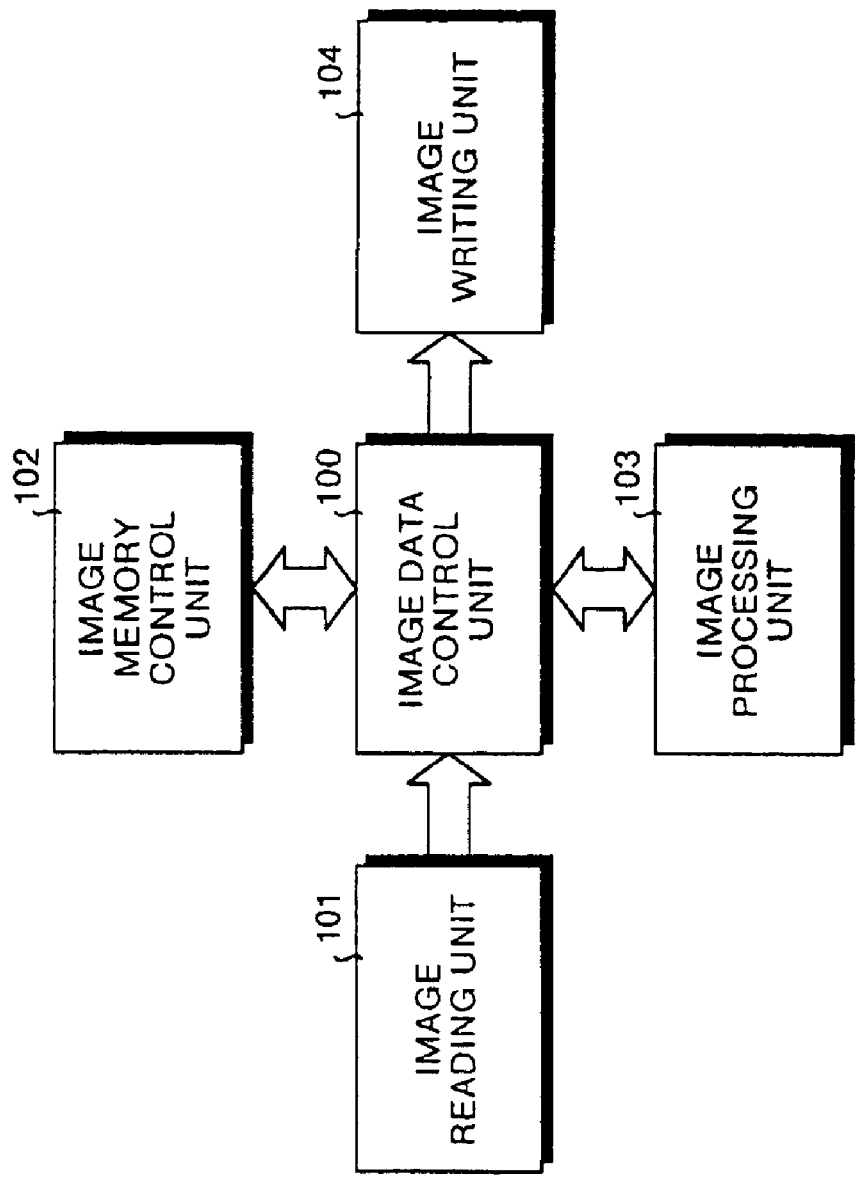
FIG. 1 is a block diagram functionally showing a configuration of an image processing apparatus according to an embodiment of this invention.

Principles of the image processing apparatus according to this embodiment are explained. FIG. 1 is a block diagram functionally showing a configuration of the image processing apparatus according to the embodiment of this invention. As shown in FIG. 1, the image processing apparatus comprises five units as follows.

The five units are an image data control unit 100, an image reading unit 101 that reads image data, an image memory control unit 102 that controls image memory for accumulating images to execute reading/writing of image data, an image processing unit 103 that subjects the image data to image processing such as editing or the like, and an image writing unit 104 that writes the image data onto transfer paper or the like.

The image data control unit 100 is arranged at the center of the units. That is, the image reading unit 101, the image memory control unit 102, the image processing unit 103, and the image writing unit 104 are connected to the image data control unit 100, respectively.

[Image Data Control Unit 100]

The processing executed by the image data control unit 100 includes those as follows. For example:

(1) Data compression to improve data transfer efficiency on the bus (Primary compression)
(2) Transfer of the primarily compressed data to image data
(3) Image synthesis (Inage data from a plurality of units can be synthesized. The synthesis also includes image synthesis on the data bus.)
(4) Image shift (Shift of an image in a main scanning direction and an auxiliary scanning direction)
(5) Expansion of an image area (Image area can be expanded to its periphery by an arbitrary amount.)
(6) Image scaling (Fixed scaling of 50% or 200%, for example)
(7) Parallel bus/interface processing
(8) Serial bus/interface processing (Interface to a process controller 211 explained later)
(9) Conversion of formats between parallel data and serial data
(11) Interface processing to the image reading unit 101
(12) Interface processing to the image processing unit 103

[Image Reading Unit 101]

The processing executed by the image reading unit 101 includes those as follows. For example:

(1) Scanning light reflected off a document by an optical system
(2) Conversion of data to electric signals in CCD (Charge Coupled Device)
(3) Digitization in the A/D converter
(4) Shading correction (Correction to nonuniformity in illumination distribution of a light source)

(5) Scanner γ-correction (Correction to density characteristics in the scanning system)

[Image Memory Control Unit 102]

The processing executed by the image memory control unit 102 includes those as follows. For example:
(1) Interface control to the system controller
(2) Parallel bus control (Interface control to the parallel bus)
(3) Network control
(4) Serial bus control (Control for a plurality of external serial ports)
(5) Internal bus interface control (Control for commands with the operation section)
(6) Local bus control (Control for access to ROM, RAM, and font data to start up the system controller)
(7) Operation control for the memory module (Write/read controls for the memory module, or the like)
(8) Control for access to the memory module (Processing for controlling memory access requests from a plurality of units)
(9) Data compression/decompression (Processing for reducing data amounts to effectively utilize the memory)
(10) Image editing (Clearing of data in a memory area, rotation of image data, and image synthesis on the memory, or the like)

[Image Processing Unit 103]

The processing executed by the image processing unit 103 includes those as follows. For example:
(1) Shading correction (Correction to nonuniformity in illumination distribution of the light source)
(2) Scanner γ-correction (Correction to density characteristics in the scanning system)
(3) MTF correction
(4) Smoothing
(5) Scaling to an arbitrary size in the main scanning direction
(6) Density conversion (γ conversion: corresponding to a density notch)
(7) Simple multi-valued processing
(8) Simple binary processing
(9) Error diffusion
(10) Dithering
(11) Phase control for dot arrangement (dots aligned on the right, dots aligned on the left)
(12) Removal of isolated points
(13) Separation of image area (Determination of color, determination of an attribute, other processing for the separation)
(14) Density conversion

[Image Writing Unit 104]

The processing executed by the image writing unit 104 includes those as follows. For example:
(1) Edge smoothing (Jaggy correction)
(2) Correction for re-arrangement of dots
(3) Pulse control for image signal
(4) Format conversion between parallel data and serial data

[Hardware Configuration of Digital Multifunction Machine]

Figure 2:
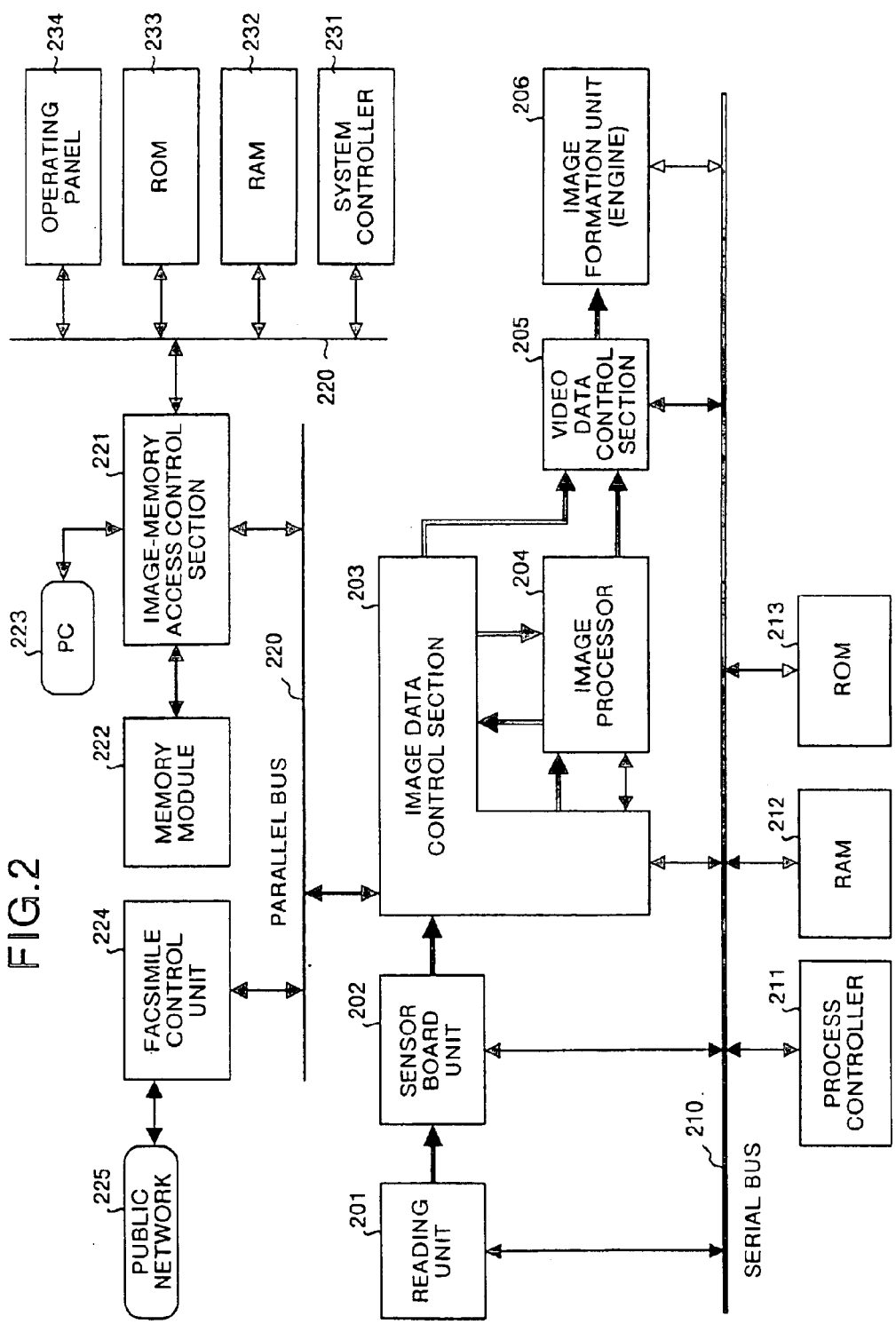
FIG. 2 is a block diagram showing an example of the configuration of hardware in the image processing apparatus according to this embodiment.

The configuration of hardware when the image processing apparatus according to this embodiment forms the digital multifunction machine is explained below. FIG. 2 is a block diagram showing an example of the configuration of the hardware in the image processing apparatus according to this embodiment.

As shown in the block diagram of FIG. 2, the image processing apparatus according to this embodiment comprises a scanning unit 201, a sensor board unit 202, an image data control section 203, an image processor (image processing unit) 204, a video data control section 205, and an image formation unit (engine) 206. The image processing apparatus according to the embodiment also comprises a process controller 211, RAM 212, and ROM 213 via a serial bus 210.

The image processing apparatus according to the embodiment further comprises an image-memory access control section 221, a memory module 222, a facsimile control unit 224, and a system controller 231, RAM 232, ROM 233 and an operating panel 234 which are connected to the image-memory access control section 221, each connected via a parallel bus 220.

A relation between the components and the respective units 100 to 104 as shown in FIG. 1 is explained below. That is, the function of the image reading unit 101 shown in FIG. 1 is performed by the scanning unit 201 and the sensor board unit 202. The function of the image data control unit 100 is performed by the image data control section 203. Further, the function of the image processing unit 103 is performed by the image processor 204.

The image writing unit 104 is formed with the video data control section 205 and the image formation unit (engine) 206. The image memory control unit 102 is formed with the image-memory access control section 221 and the memory module 222.

The contents of each component is explained below. The scanning unit 201, that optically scans a document, comprises a lamp, a mirror, and a lens. Reflection light of the light irradiated from a lamp to the document is converged to a photoreceptor through the mirror and the lens.

The photoreceptor such as a CCD is mounted on the sensor board unit 202. The image data converted to electric signals in the CCD is converted to digital signals, and is output (transmitted) from the sensor board unit 202.

The image data output (transmitted) from the sensor board unit 202 is input (received) into the image data control section 203. The image data control section 203 controls overall transmission of the image data between functional devices (processing units) and data buses.

The image data control section (image data/interface control section) 203 performs image-data transfer between the sensor board unit 202, the parallel bus 220, and the image processor 204, and also performs image-data communications between the process controller 211 and the system controller 231 that controls the overall image processing apparatus. The RAM 212 is used as a work area of the process controller 211, and the ROM 213 stores a boot program or the like of the process controller 211.

The image processor 204 is a programmable computation unit that performs image processing. The image data output (transmitted) from the sensor board unit 202 is transferred (transmitted) to the image processor 204 through the image data control section 203. Signal degradation (signal degradation in a scanner system) due to the optical system and during quantization of the image data to digital signals is corrected in the image processor 204, and the corrected signals are output (transmitted) to the image data control section 203 again.

The image-memory access control section 221 controls writing and reading of the image data in and from the memory module 222. The system controller 231 controls operations of the respective components connected to the parallel bus 220. The RAM 232 is used as a work area of the system controller 231, and the ROM 233 stores a boot program or the like of the system controller 231.

The processing that has to be done by the image processing apparatus is entered through the operating panel 234. For example, a type of processing (copying, facsimile transmission, image scanning, or printing) and a number of copies to be processed are entered through the operating panel 234. Accordingly, control information for the image data can be input. The contents of the facsimile control unit 224 will be explained later.

The processing for the image data scanned by the scanning unit 201 includes a job that accumulates the scanned image data in the memory module 222 and reuses the data and a job that does not accumulate the data in the memory module 222. The respective cases are explained below.

As an example of accumulating the scanned image data in the memory module 222, there is a case of making a plurality copies of a sheet of document. In this case, the scanning unit 201 is operated only once, the image data scanned by the scanning unit 201 is accumulated in the memory module 222, and the image data accumulated in the memory module 222 is read out a plurality of times.

As an example of not using the memory module 222, there is a case of making only a copy of a sheet of document. In this case, the scanned image data may be reproduced as it is. Accordingly, there is no need for the image-memory access control section 221 to access the memory module 222.

When the memory module 222 is not used, the data transferred from the image processor 204 to the image data control section 203 is returned again from the image data control section 203 to the image processor 204. The image processor 204 performs the processing for image quality to convert the brightness data obtained by the CCD in the sensor board unit 202 to area gradation.

The image data whose image quality has been processed is transferred from the image processor 204 to the video data control section 205. The video data control section 205 provides pulse controls for the signals converted to the area gradation in order to perform post-processing for dot arrangement and reproduce the dots. The image data is then transmitted to the image formation unit 206, which forms a reproduction image on transfer paper.

A flow of image data is explained below. More specifically, the flow of image data shows the case where image data is accumulated in the memory module 222 and additional processing, such as rotation of an image direction or synthesis of images, is performed at the time of reading out the images. The image data transferred from the image processor 204 to the image data control section 203 is sent from the image data control section 203 to the image-memory access control section 221 through the parallel bus 220.

This image-memory access control section 221 provides controls for accesses to the image data and the memory module 222, and performs decompression of data for printing of an external PC (personal computer) 223, and compression or decompression of the image data to make effective use of the memory module 222.

The image data sent to the image-memory access control section 221 is accumulated in the memory module 222 after the data is compressed, and the accumulated image data is read out as required. The read-out image data is decompressed and restored to the original image data, and the data is returned from the image-memory access control section 221 to the image data control section 203 through the parallel bus 220.

The image data after transferred from the image data control section 203 to the image processor 204 is subjected to processing for image quality and is pulse-controlled in the video data control section 205 to form a reproduction image on transfer paper in the image formation unit 206. In the flow of image data, the functions of the digital multifunction machine are performed through the parallel bus 220 and based on bus control provided by the image data control section 203.

Facsimile transmission is performed by executing image processing on the read-out image data in the image processor 204 and transferring the image data to the facsimile control unit 224 through the image data control section 203 and the parallel bus 220. The facsimile control unit 224 converts the data to that for a communication network and transmits the converted data as facsimile data to a public network (PN) 225.

Facsimile reception is carried out by converting the network data from the public network (PN) 225 to image data in the facsimile control unit 224 and transferring the data to the image processor 204 through the parallel bus 220 and the image data control section 203. In this case, specific processing for image quality is not performed on the data, but the video data control section 205 performs re-arrangement of dots and pulse controls, and the image formation unit 206 forms a reproduction image on transfer paper.

There are a plurality of jobs, such as a copying function, a facsimile transmission/reception function, and a printer output function. Under the situation that the plurality of jobs operate in parallel, the system controller 231 and the process controller 211 provide controls for allocation of accesses by the scanning unit 201, the image formation unit 206, and the parallel bus 220 to the respective jobs.

The process controller 211 controls the flow of image data, and the system controller 231 controls the overall system to manage starting of resources. Selection of the functions of the digital multifunction machine is executed in the operating panel (operation section) 234, and contents of processing such as the copying function or the facsimile function are set by selecting and entering any of the functions through the operating panel (operation section) 234.

The system controller 231 and the process controller 211 performs interactive communications through the parallel bus 220, the image data control section 203, and the serial bus 210. More specifically, communications between the system controller 231 and the process controller 211 are performed by converting data formats to each other for data interfaces between the parallel bus 220 and the serial bus 210 in the image data control section 203.

[Hardware Configuration of Scanner as Discrete Device]

Figure 3:
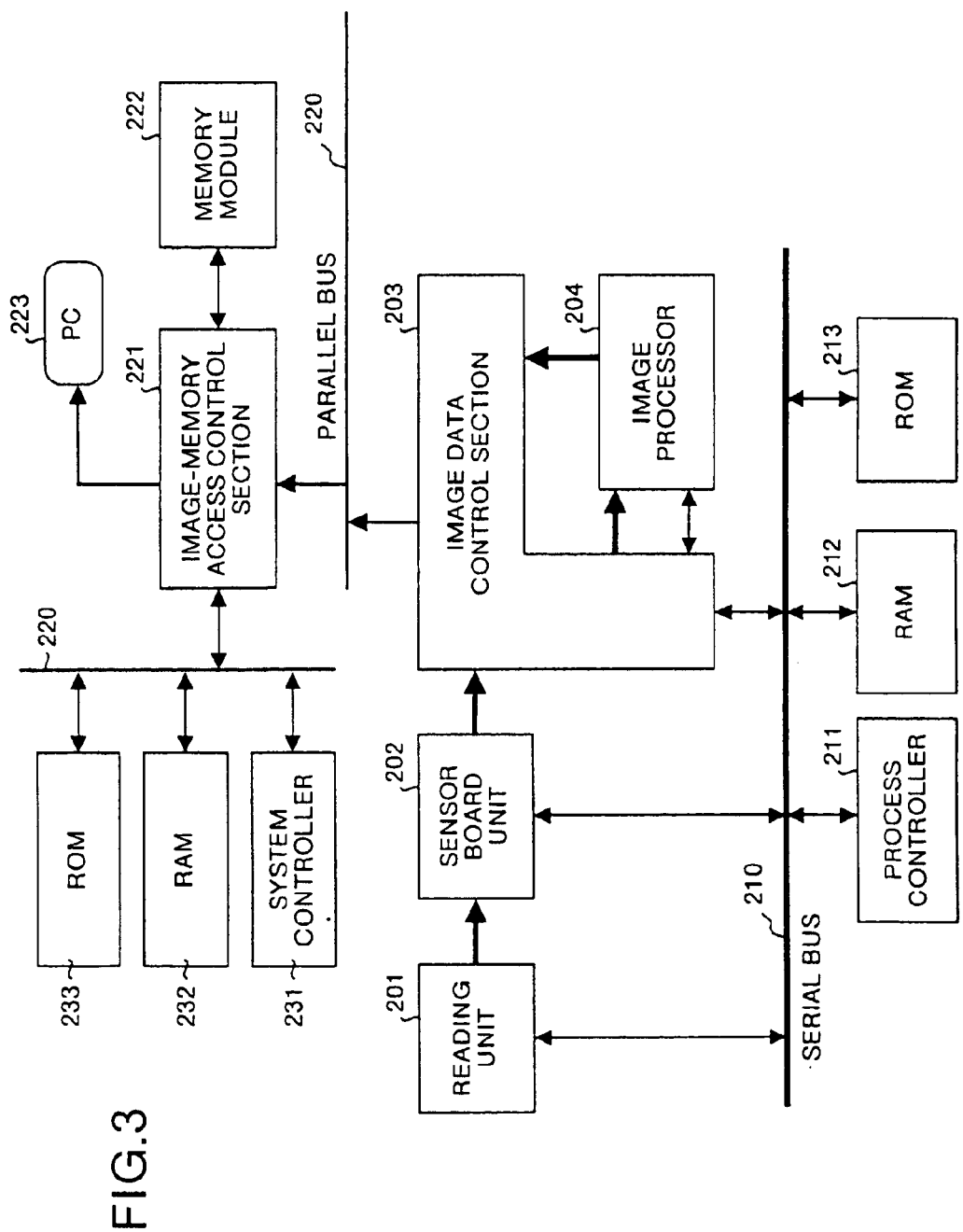
FIG. 3 is a block diagram showing another example of the configuration of the hardware in the image processing apparatus according to the embodiment.

A configuration of hardware when the image processing apparatus according to the embodiment forms a scanner as a discrete device is explained blow. FIG. 3 is a block diagram showing another example of the hardware configuration of the image processing apparatus according to the embodiment. The same reference numerals are assigned to the components corresponding to those in the block diagram of the hardware configuration shown in FIG. 2 and explanation of the components is omitted.

In the system configuration of the hardware, a big difference between the discrete scanner shown in FIG. 3 and the digital multifunction machine shown in FIG. 2 is that the discrete scanner has no image formation unit 206. There is no need to provide the image formation unit 206, therefore, the video data control section 205 is not mounted on the scanner as well.

The image data scanned in the scanning unit 201 is converted to digital data in the sensor board unit 202, and is transferred to the image processor 204 via the image data control section 203. The image processor 204 then performs image processing required as a discrete scanner on the data.

The main image processing required as a discrete scanner is correction to degradation in the scanned image. The image processor 204 can also perform gray-scale processing adequate for a display unit using a screen. Accordingly, the processing is different in many ways from the processing for image quality targeting the transfer paper.

The image processor 204 is formed with the programmable computation unit. Therefore, only the sequence of processing, that is required for the processing for image quality suitable for the transfer paper and gray-scale processing to the screen, may be set. Thus, there is no need to provide both the sequence of image-quality processing and the sequence of gray-scale processing all the time.

The image data on which the gray-scale processing is performed is transferred to the image data control section 203 and is transmitted to the image-memory access control section 221 through the parallel bus 220. The function of the scanner is performed here by using the memory module 222 as buffer memory and transferring image data to a driver that accompanies a PC 223.

In this case, the system controller 231 and the process controller 211 also manage the image data and the resources of the system in the same manner as that of the digital multifunction machine.

[Image Processing Unit 103/Image Processor 204]

Figure 4:
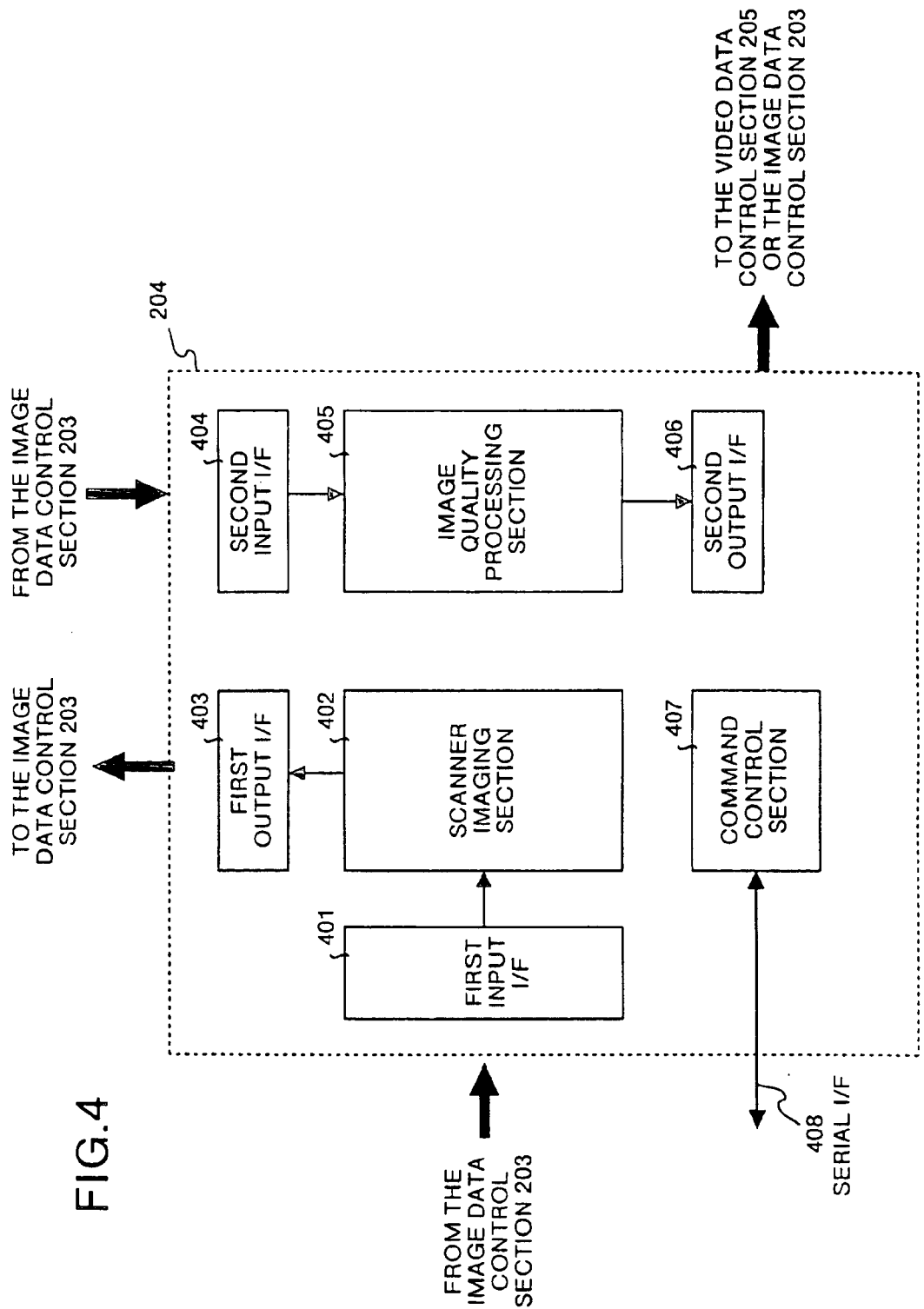
FIG. 4 is a block diagram showing a general outline: of processing in an image processor for the image processing apparatus according to the embodiment.

A general outline of the processing in the image processor 204 that forms the image processing unit 103 is explained below. FIG. 4 is a block diagram showing the general outline of the processing in the image processor 204 for the image processing apparatus according to the embodiment.

As shown in the block diagram of FIG. 4, the image processor 204 comprises a first input I/F 401, a scanner imaging section 402, a first output I/F 403, a second input I/F 404, an image quality processing section 405, a second output I/F 406, and a command control section 407.

Based on the configuration, the scanned image is transferred from the first input interface (I/F) 401 of the image processor 204 to the scanner imaging section 402 via the sensor board unit 202 and the image data control section 203.

The purpose of scanner imaging performed in the scanner imaging section 402 is to correct degradation in the scanned image data. More specifically, shading correction, scanner γ-correction, and MTF correction, or the like are performed. Further, scaling such as enlargement or reduction of the image size can also be performed although it is not the processing for correction. When the correction to the scanned image data is completed, the image data is transferred from the first output interface (I/F) 403 to the image data control section 203.

When the image data is to be output onto the transfer paper, the second input I/F 404 receives the image data from the image data control section 203, and the image quality processing section 405 performs the processing for area gradation on the data. The image data on which the image quality processing is performed is output to the video data control section 205 or the image data control section 203 via the second output I/F 406.

The processing for area gradation in the image quality processing section 405 includes the processing for density conversion, dithering, and error diffusion or the like. That is, the main processing of all is to obtain an approximation of the area based on the gradation information.

Once the image data processed by the scanner imaging section 402 is accumulated in the memory module 222, variations of reproduction image can be obtained by changing the processing for image quality by the image quality processing section 405.

For example, diffusing (altering) the density of a reproduction image or altering the number of lines of a dither matrix allows the feel of the reproduction image to easily be changed. In this case, there is no need to restart reading in the image from the scanning unit 201 each time the processing is changed. Therefore, different processing can quickly be executed to the same image data any number of times by reading out the accumulated image data from the memory module 222.

In the case of the discrete scanner, both the scanner imaging and the gray-scale processing are performed on the data, and the data is output to the image data control section 203. The contents of the processing can be altered in a programmable manner. Selection of the processing and alteration of the sequence of the processing or the like are managed in the command control section 407 via a serial I/F 408.

Figure 5:
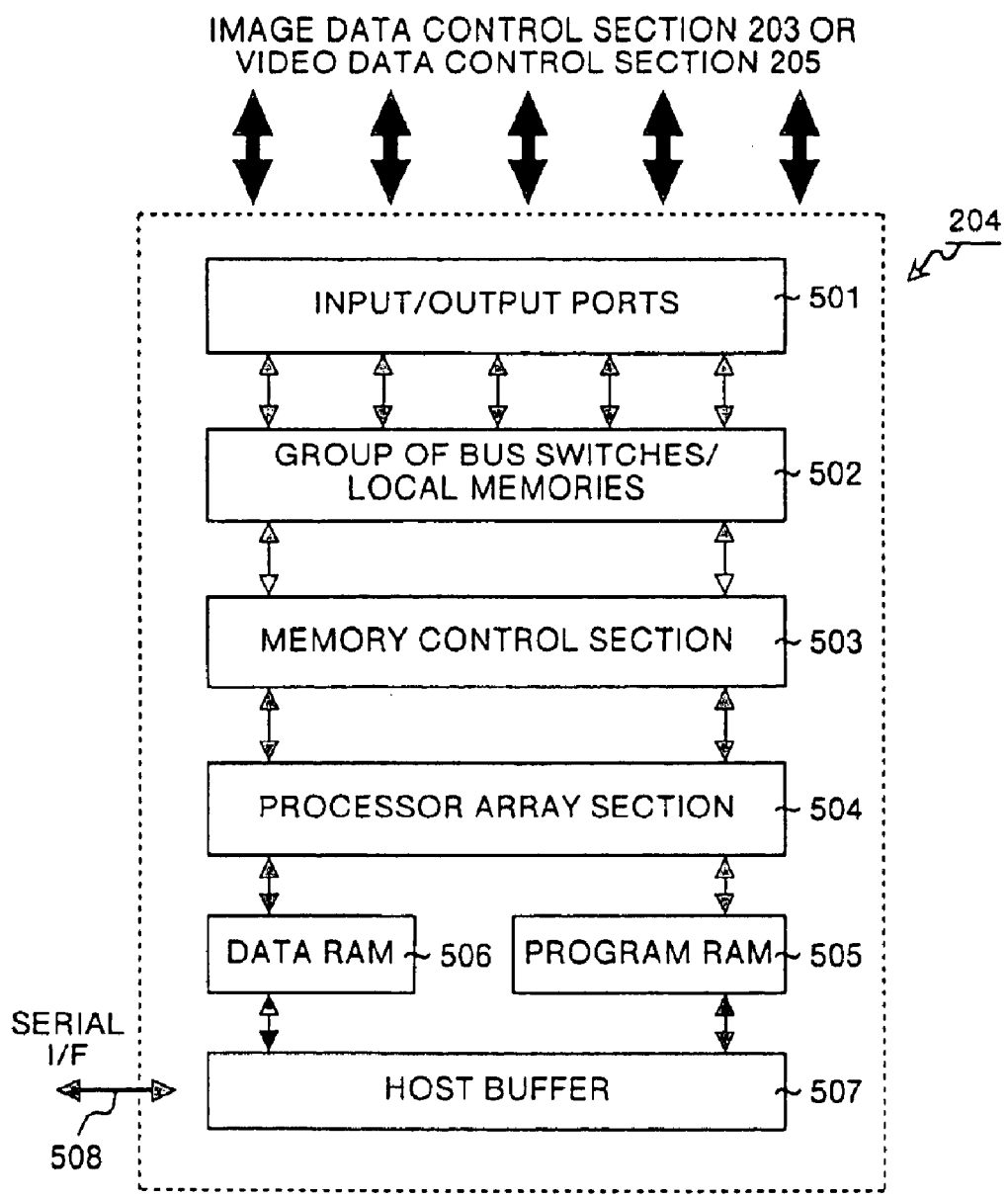
FIG. 5 is a block diagram showing an internal configuration of the image processor for the image processing apparatus according to the embodiment.

An internal configuration of the image processor 204 is explained below. FIG. 5 is a block diagram showing the internal configuration of the image processor 204 in the image processing apparatus according to the embodiment. The image processor 204 has a plurality of input/output ports 501 for data input/output to/from the outside, each in which arbitrary setting can be made for input or output of data, respectively.

The image processor 204 has a group of bus switches/local memories (first storage section) 502 internally provided for connection to the input/output ports 501, and a memory control section 503 controls a memory area and a data path to be used. The group of bus switches/local memories 502 are allocated as buffer memories to input data and data to be output, and the data is stored in the respective memories, thus interface to the outsider is controlled.

A processor array section (image processing section) 504 performs various processing for the image data stored in the group of bus switches/local memories 502, and stores again the result of output (processed image data) in the group of bus switches/local memories 502.

The sequence of processing and the parameters for the processing in the processor array section 504 are exchanged between program RAM 505 and data RAM 506 (second storage section) that can be referred to by a unit for controlling data processing in the processor array section 504.

The contents of the program RAM 505 and the data RAM 506 are downloaded from the process controller 211 into a host buffer (third storage section) 507 via a serial I/F 508, are timing-controlled by the host buffer 507, and then the contents are updated with the downloaded ones. The process controller 211 reads but the contents of the data RAM 506, that has been timing-controlled and read out by the host buffer 507, onto the host buffer 507 land monitors how the processing is going on based on the contents.

The case, that the contents of the processing is to be altered or the form of processing required in the system is to be altered, is dealt with by updating the contents of the program RAM 505 and the data RAM 506 that the processor array section 504 refers to.

Figure 6:
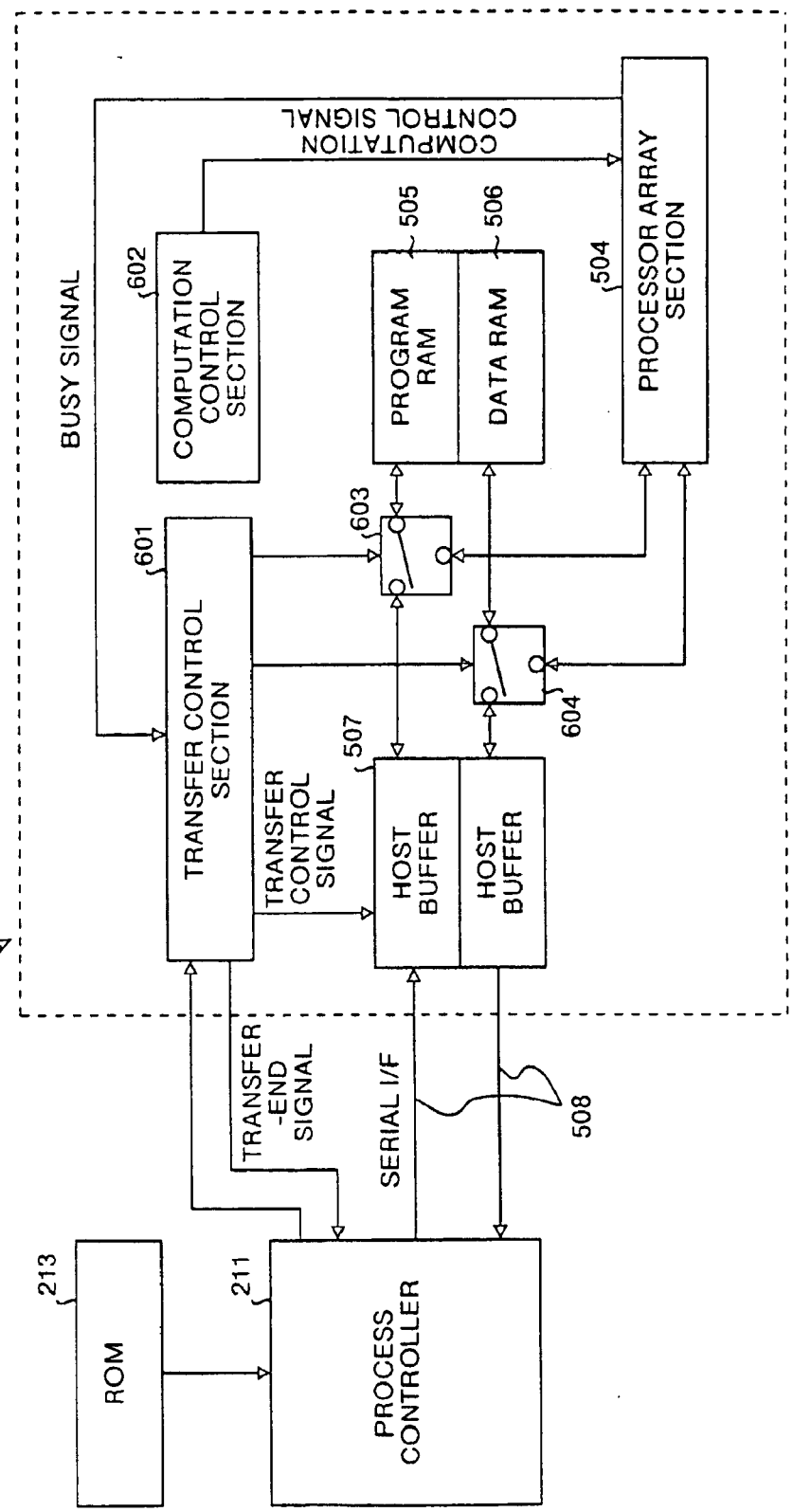
FIG. 6 is a block diagram showing a general outline of processing for updating the contents of program RAM and data RAM in the image processor for the image processing apparatus according to the embodiment.

The operation of updating the contents of the program RAM 505 and the data RAM 506 is explained in detail below with reference to FIG. 6. It is assumed here that the current operation of this apparatus is copying. More specifically, in this apparatus, the image signals scanned by the scanning unit 201 are processed along the flow as follows to form a reproduction image: the image data control section 203→image processor 204→image data control section 203→image processor 204→video data control section 205→image formation unit 206.

If a facsimile reception request comes up, the process controller 211 transfers the sequence of processing and the data for the processing required for facsimile reception from the ROM 213, that is provided near to the controller, to the host buffer 507 of the image processor 204 via the serial I/F 508. The process controller 211 notifies a transfer control section 601 in the image processor 204 of the end of the transfer with a transfer-end signal.

When the transfer-end signal is received, the transfer control section 601 checks a busy signal from the processor array section 504. If this signal is inactive, the transfer control section 601 determines that the processor array section 504 is not used for computation based on a computation control signal output by a computation control section 602. That is, the transfer control section 601 determines that the processor array section 504 is during idle cycle time that the processor array section 504 does not execute image processing. The transfer control section 601 then switches from the connection of the program PAM 505 or the data RAM 506 with the processor array section 504 to the connection thereof with the host buffer 507 by a switching section 603 or 604.

The data in the host buffer 507 starts to be transferred to either of the RAMs via the serial I/F 508 at a speed higher than the transfer speed between the host buffer 507 and the process controller 211, and a predetermined number of pieces of data are transferred. The adequate number of pieces of data is set by the process controller 211 so that the busy signal becomes active after the transfer is completed.

The transfer control section 601 provides controls for transfer so that the sequence of image processing and data for the image processing to be added or updated are split into blocks for a plurality of transfer times, each by a predetermined number of pieces of data to be transferred for one time, and that the blocks are transferred from the host buffer 507 as the third storage section to the program RAM 505 and the data RAM 506 as the second storage section.

A sequence of data transfer from the host buffer 507 to the program RAM 505 and the data RAM 506 is explained in detail below with reference to FIG. 7 and FIG. 8.

Figure 8:
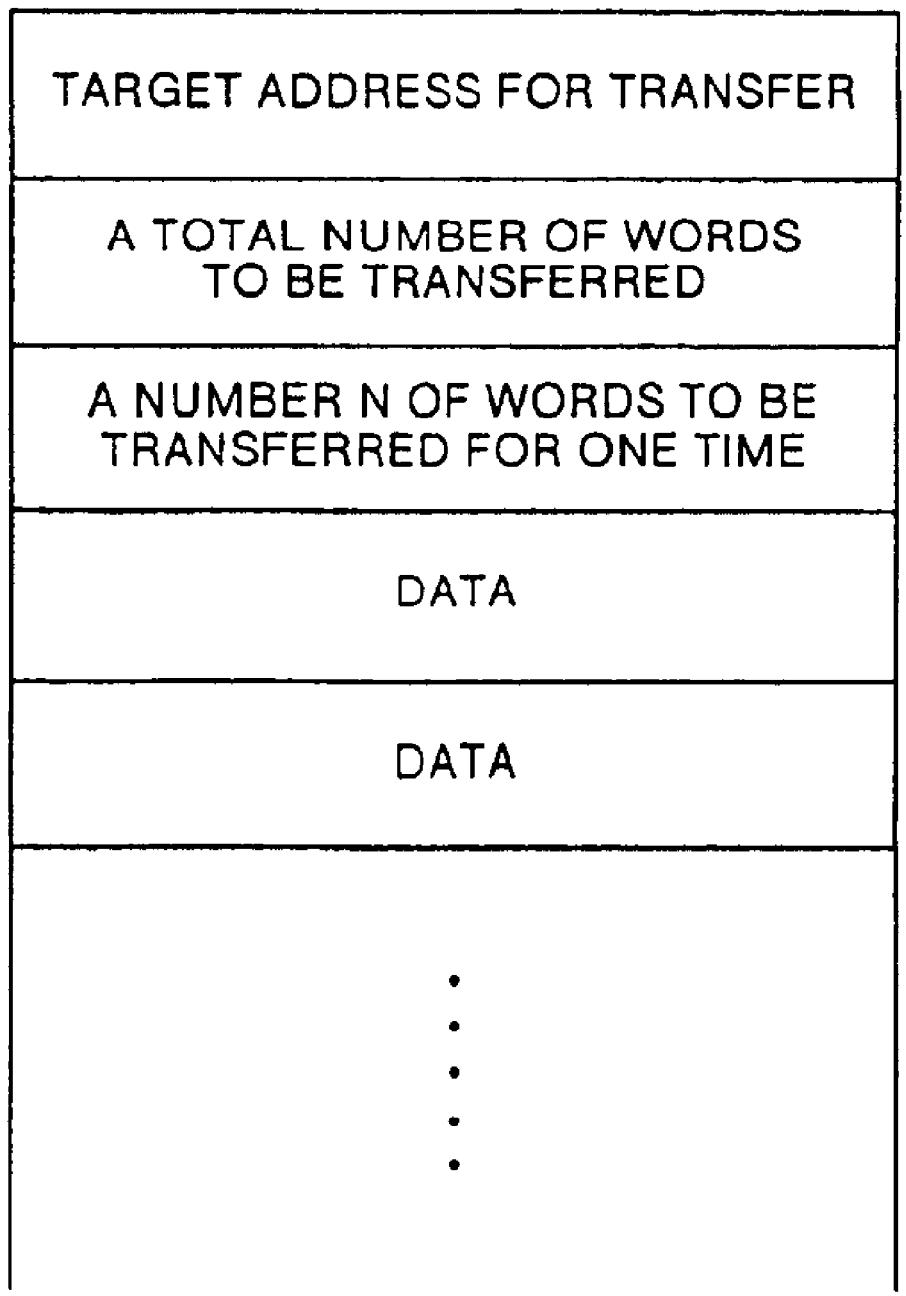
FIG. 8 shows a data format for updating the contents of the program RAM and the data RAM in the image processor for the image processing apparatus according to the embodiment.

FIG. 8 shows a format of data to be transferred from the process controller 211 to the host buffer 507. This data format is structured with a header including a target address for transfer, a total number of words to be transferred, and a number N of words to be transferred for one time, and data to be transferred. The process controller 211 can set the number N of pieces of data to be transferred for one time to an adequate value according to the length of idle cycle time determined based on the ability of the image processing section 204 to perform image processing.

Figure 7:
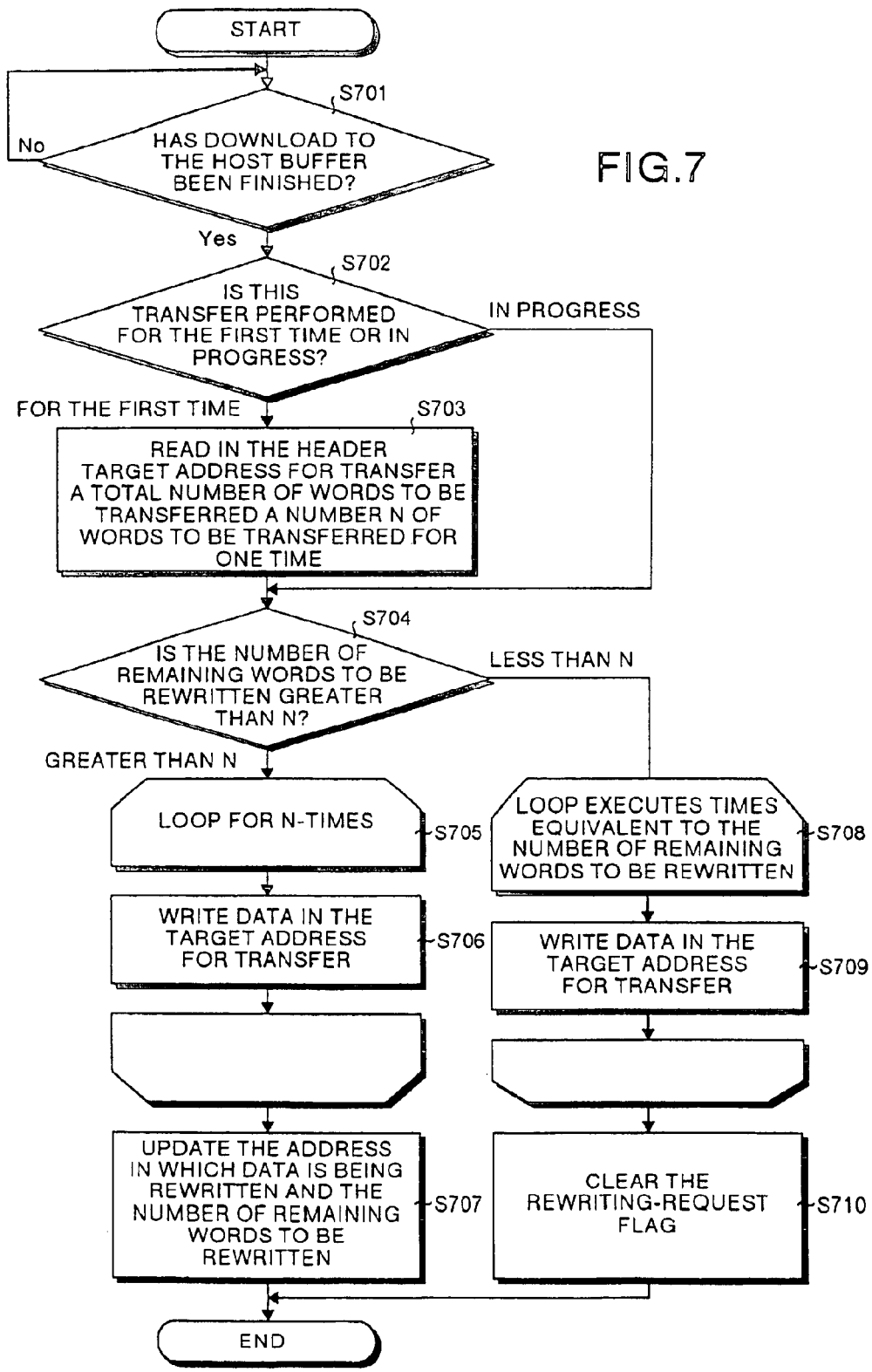
FIG. 7 is a flow chart showing a process flow of updating the contents of the program RAM and the data RAM in the image processor for the image processing apparatus according to the embodiment.

FIG. 7 shows a process flow of data transfer. When download from the process controller 211 to the host buffer 507 is finished (step S701), it is determined whether this transfer is performed for the first time or in progress (step S702). At the time of initial transfer, the target address for transfer, the total number of words to be transferred, and the number N of words to be transferred for one time are read-in based on the data format shown in FIG. 8 (step S703). The number N of words to be transferred for one time represents an optimal number of words to be transferred in the image processing apparatus.

A number of remaining words to be rewritten (which is equal to the total number of words to be transferred at the initial time) is compared to the number N of words to be transferred for one time (step S704). When the number of remaining words to be rewritten is greater than the number N of words to be transferred for one time, the transfer is executed for N times and data is written in the target address for transfer (step S705, step S706). The address in which the data is being rewritten and the number of remaining words to be rewritten are updated (step S707), and the next transfer is waited. At the time of next transfer, the processing is started from the flow that the transfer has been terminated of the flow chart.

When the number of remaining words to be rewritten is equal to or less than the number N of words to be transferred for one time, the transfer is performed for times equivalent to the number of remaining words to be rewritten, and the data is written in the target address for transfer (step S708, step S709), and a rewriting-request flag is cleared (step S710), and then the flow ends.

After the data transfer is finished, the transfer control section 601 restores the connection between the processor array section 504 and the program RAM 505/the data RAM 506 to allow the copying operation and the facsimile reception operation to be performed in parallel like the controls for the plurality of jobs.

A timing at which the busy signal sent from the processor array section 504 becomes inactive is explained below. The image processor 204 sequentially processes a plurality of raster-scanned line data. As explained above, the processor array section 504 performs various processing on the image data stored in the group of bus switches/local memories 502, and stores again the results of output in the group of bus switches/local memories 502.

The processing in the processor array section 504 is allowed to be performed at a higher speed than the speed at the time of storing the data in the group of bus switches/local memories 502. Therefore, there must exist some time (period), when the processor array section 504 does not need to perform processing, from the end of processing for the current line up to the time when all the data for the next line is stored in the group of bus switches/local memories 502. It is possible to make the busy signal inactive for this time (period).

The sequence of processing or the data for the processing are transferred at a high speed, therefore, the sequence of the processing for facsimile reception and the data for the processing can be transferred without interruption of the copying operation or the other operation, which allows the program to be added or updated.

[Image Data Control Unit 100/Image Data Control Section 203]

Figure 9:
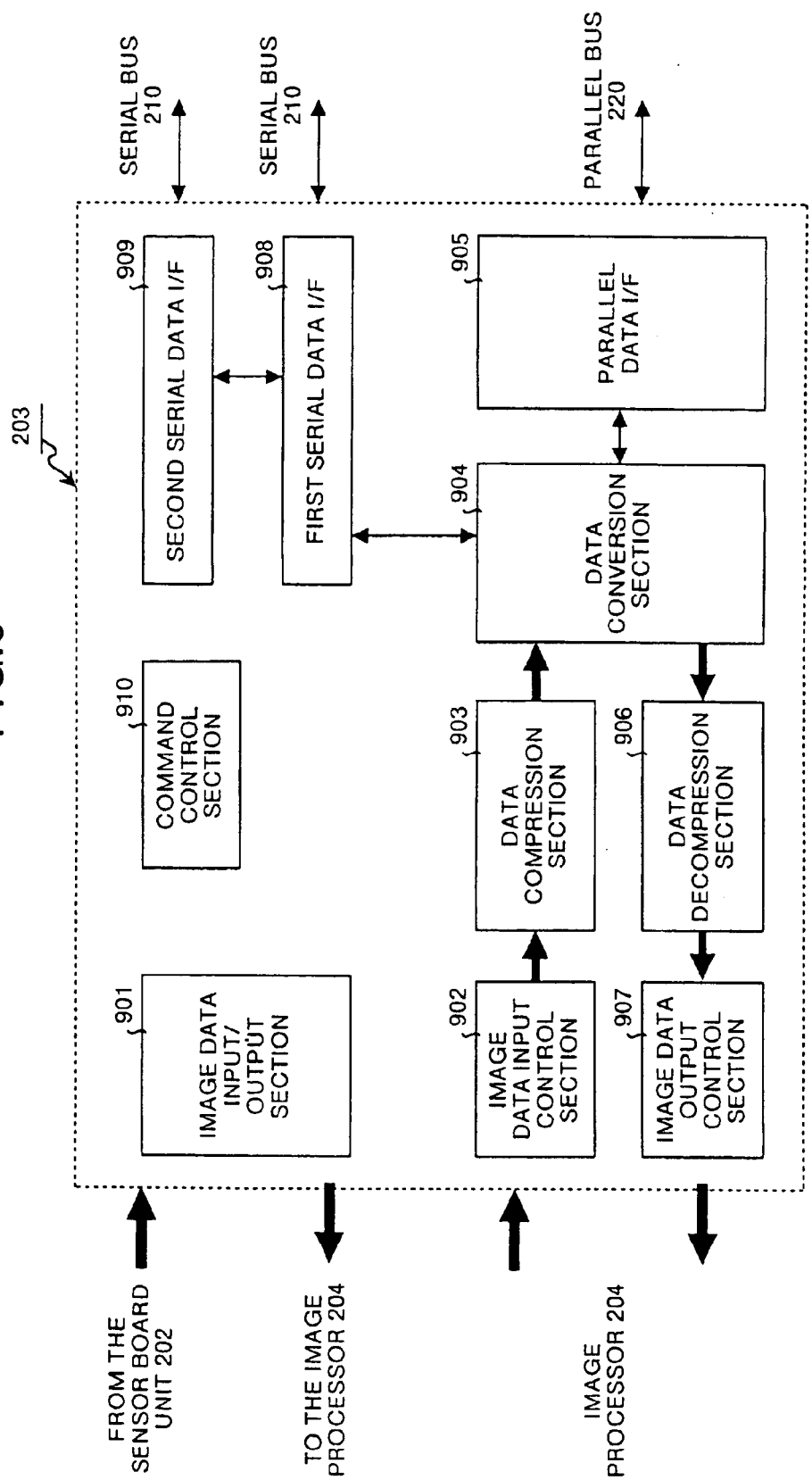
FIG. 9 is a block diagram showing a general outline of processing in an image data control section for the image processing apparatus according to the embodiment.

A general outline of the processing in the image data control section 203 that forms the image data control unit 100 is explained below. FIG. 9 is a block diagram showing the general outline of the processing in the image data control section 203 for the image processing apparatus according to the embodiment.

As shown in the block diagram of FIG. 9, an image data input/output section 901 inputs (receives) image data from the sensor board unit 202 and outputs (transmits) the image data to the image processor 204. That is, the image data input/output section 901 is a section that makes connections between the image reading unit 101 and the image processing unit 103 (image processor 204). In other words, the section 901 is an input/output section dedicated to transmission of the image data read-out by the image reading unit 101 to the image processing unit 103.

An image data input control section 902 inputs (receives) the image data obtained by correcting the scanned image in the image processor 204. The input image data is subjected to data compression in a data compression section 903 in order to enhance transmission efficiency in the parallel bus 220. The compressed data is then sent out to the parallel bus 220 through a data conversion section 904 and a parallel data I/F 905.

The image data received from the parallel bus 220 through the parallel data I/F 905 is sent to a data decompression section 906 through the data conversion section 904 because the data has been compressed for its transmission on the bus, and the image data is subjected to data decompression. An image data output control section 907 transmits the decompressed image data to the image processor 204.

The image data control section 203 also has a data conversion function between parallel data and serial data. The system controller 231 transfers the data to the parallel bus 220, and the process controller 211 transfers the data to the serial bus 210. The image data control section 203 performs data conversion for communications between the two controllers.

The serial data I/F comprises a first serial data I/F 908 that performs data transaction with the process controller via the serial bus 210, and a second serial data I/F 909 used for data exchange with the image processor 204. One system is independently provided between the image data control section 203 and the image processor 204, which allows interface to the image processor 204 to be executed more smoothly.

A command control section 910 controls operations of each component and each interface in the image data control section 203 according to a received command.

[Image Writing Unit 104/Video Data Control Section 205]

Figure 10:
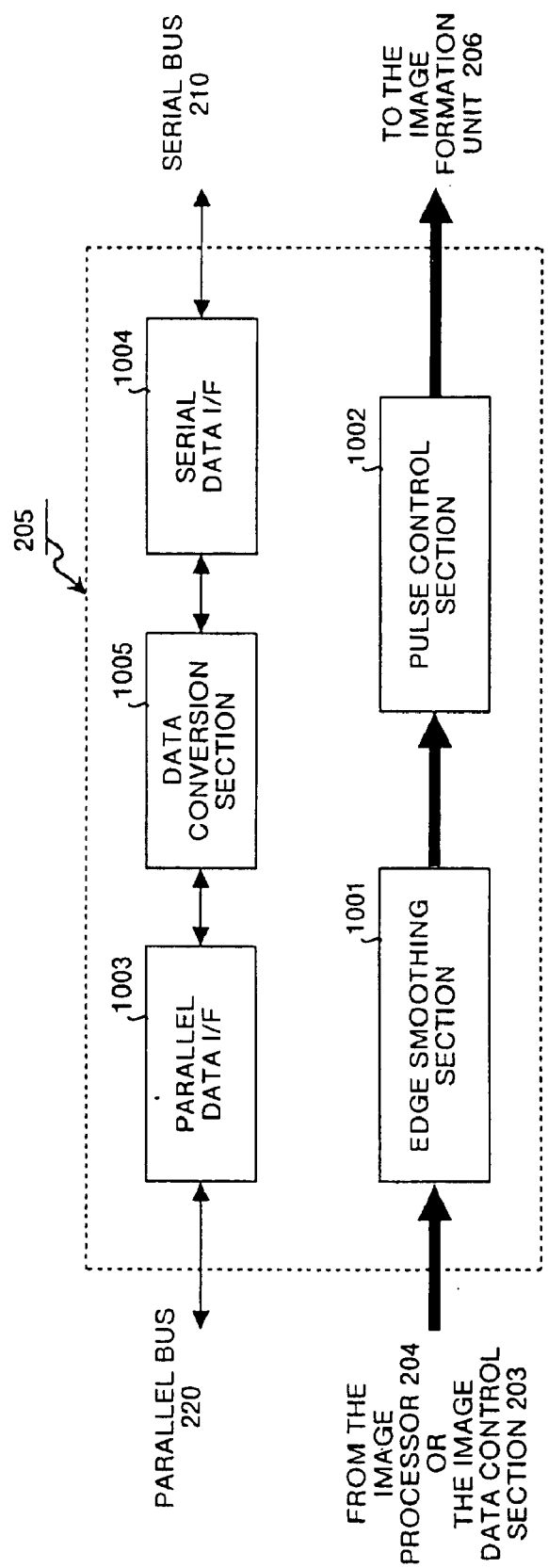
FIG. 10 is a block diagram showing a general outline of processing for video data in the image processing apparatus according to the embodiment.

A general outline of the processing in the video data control section 205 that partially forms the image writing unit 104 in the image processing apparatus according to the embodiment. FIG. 10 is a block diagram showing the general outline of the processing in the video data control section 205 for the image processing apparatus according to the embodiment.

As shown in the block diagram of FIG. 10, the video data control section 205 performs additional processing on the input image data according to the characteristics of the image formation unit 206. That is, an edge smoothing section 1001 performs re-arrangement of dots through edge smoothing, and a pulse control section 1002 controls pulses of image signals to form dots land outputs the processed image data to the image formation unit 206.

The video data control section 205 has a format conversion function between parallel data and serial data separately from the image-data conversion. Therefore, even the video data control section 205 as a discrete device can support communications between the system controller 231 and the process controller 211.

That is, the video data control section 205 comprises a parallel data I/F 1003 that transmits and receives parallel data, a serial data I/F 1004 that transmits and receives serial data, and a data conversion section 1005 that converts respective data received by the parallel data I/F 1003 and the serial data I/F 1004 to data in the other format. Thus, the formats of both of the data can be converted to each other.

[Image Memory Control Unit 102/Image-Memory Access Control Section 221]

Figure 11:
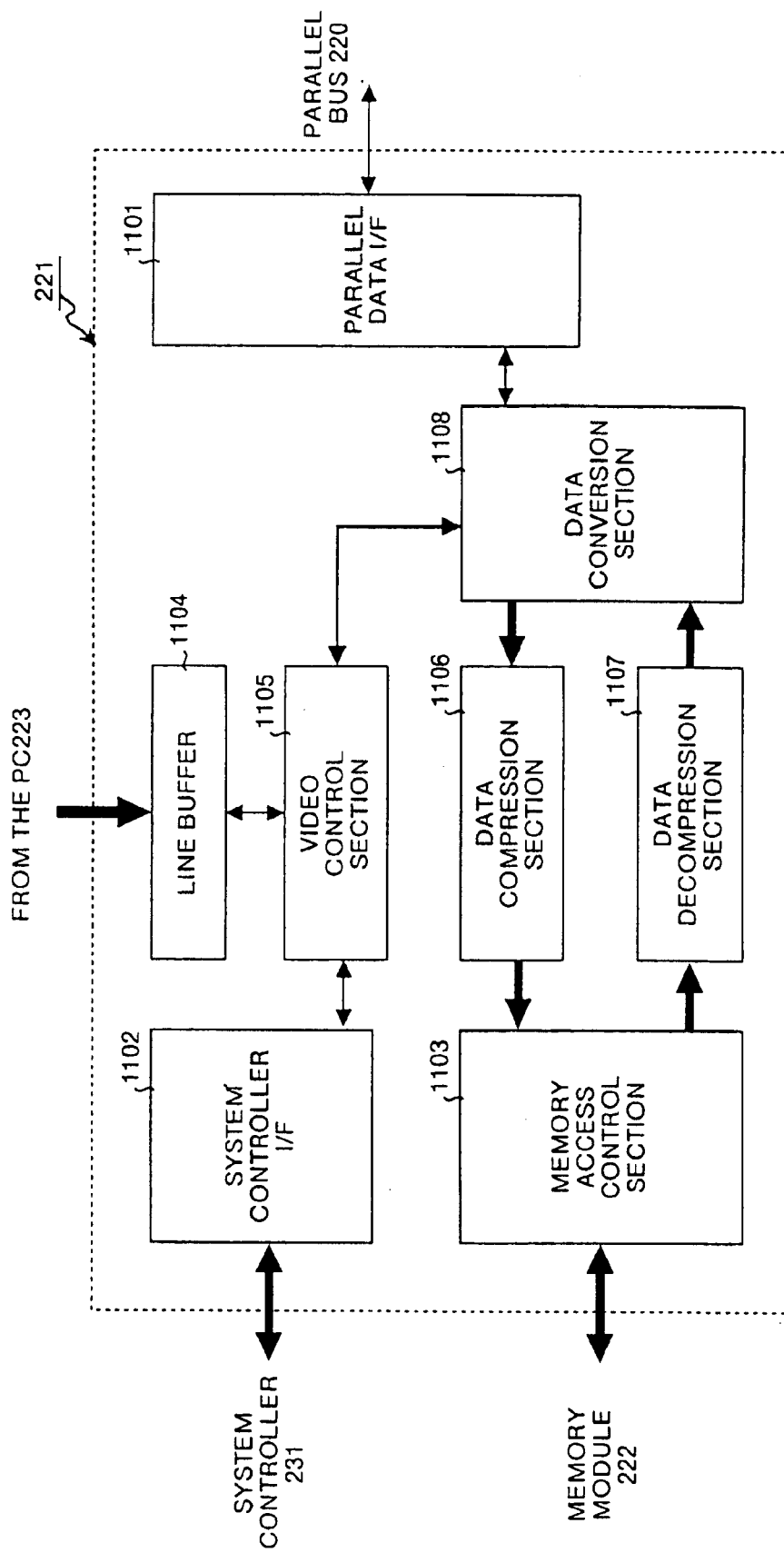
FIG. 11 is a block diagram showing a general outline of processing of the image-memory access control section in the image processing apparatus according to the embodiment.

A general outline of the processing in the image-memory access control section 221 that partially forms the image memory control unit 102 is explained below. FIG. 11 is a block diagram showing the general outline of the processing of the image-memory access control section 221 in the image processing apparatus according to the embodiment.

As shown in the block diagram of FIG. 11, the image-memory access control section 221 manages the interface for image data to the parallel bus 220, and controls access, that is, storing (writing-in)/reading of the image data in/from the memory module 222. Further, the image-memory access control section 221 controls decompression of coded data received mainly from an external PC 223 to image data.

Accordingly, the image-memory access control section 221 comprises a parallel data I/F 1101, a system controller I/F 1102, a memory access control section 1103, a line buffer 1104, a video control section 1105, a data compression section 1106, a data decompression section 1107, and a data conversion section 1108.

The parallel data I/F 1101 manages the interface for image data to the parallel bus 220. The memory access control section 1103 controls access, that is, storing (writing-in)/reading of the image data in/from the memory module 222.

The received coded data is stored in a local area of the line buffer 1104. The video control section 1105 decompresses the coded data stored in the line buffer 1104 to image data based on the instruction for decompression received from the system controller 231 through the system controller I/F 1102.

The decompressed image data or the image data received from the parallel bus 220 via the parallel data I/F 1101 is stored in the memory module 222. In this case, the data conversion sect ion 1108 selects any image data as an object to be stored, the data compression section 1106 compresses the data to increase the efficiency of using the memory, and the memory access control section 1103 stores (writes) the image data in the memory module 222 with management of the addresses in the memory module 222.

The memory access control section 1103 reads out the image data stored (accumulated) in the memory module 222 by controlling the target address to be read out, and the data decompression section 1107 decompresses the read-out image data. When the decompressed image data is to be transferred to the parallel bus 220, the data transfer is carried out via the parallel data I/F 1101.

[Configuration of Units]

Figure 12:
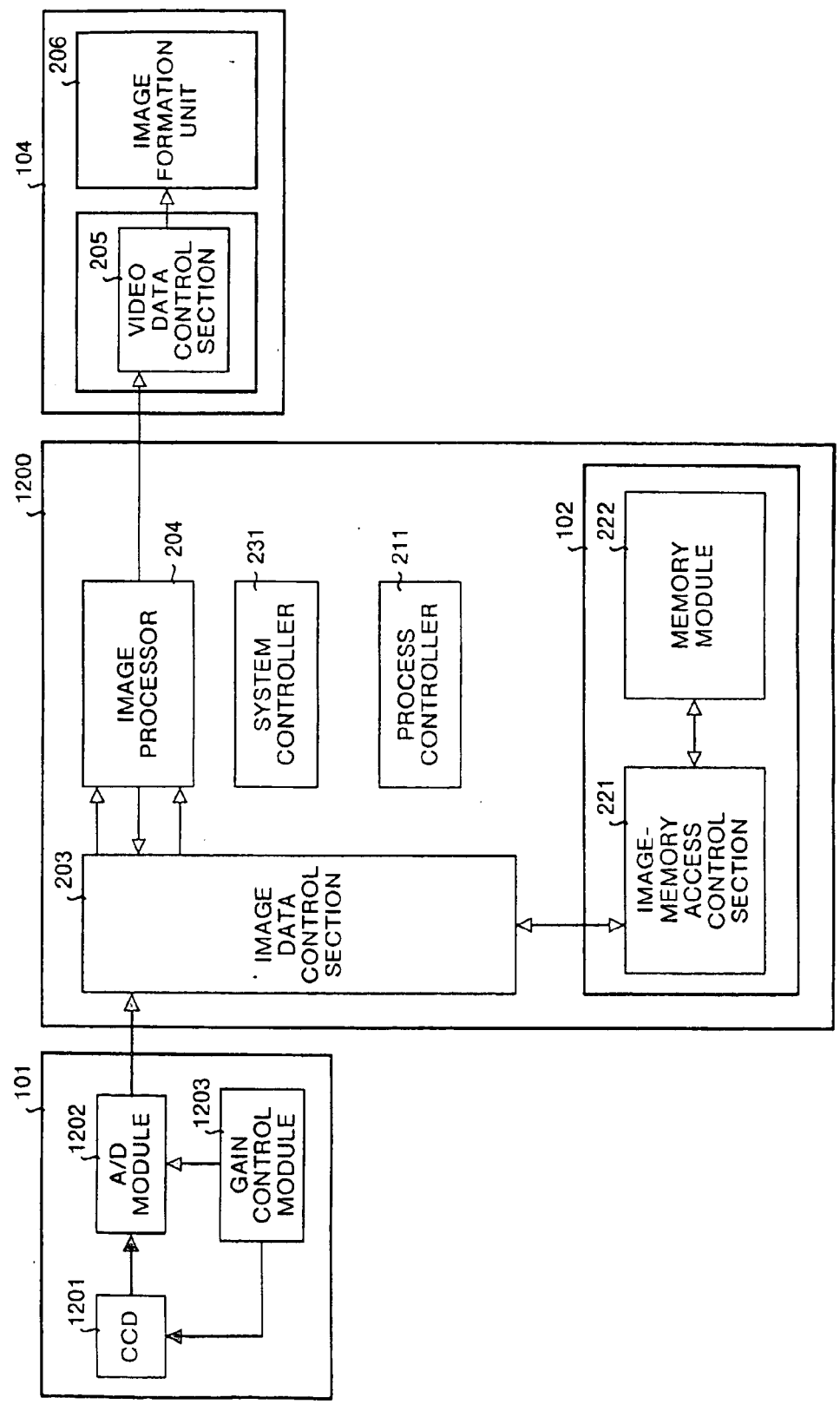
FIG. 12 is a block diagram showing an example of a configuration of units in the image processing apparatus according to the embodiment.
Figure 13:
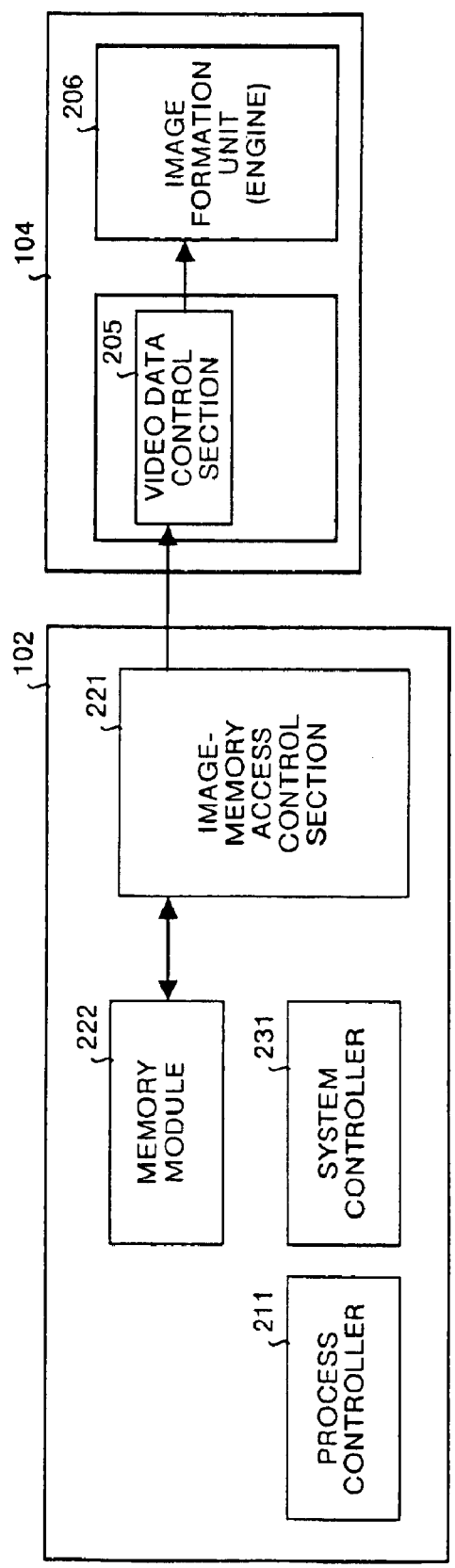
FIG. 13 is a block diagram showing another example of the configuration of units in the image processing apparatus according to the embodiment.

The configuration of units in the image processing apparatus according to the embodiment is explained below. FIG. 12 is a block diagram showing an example of the configuration of units when the image processing apparatus is a digital multifunction machine. FIG. 13 is a block diagram showing an example of the configuration of units when the image processing apparatus is a printer as a discrete device.

The digital multifunction machine as shown in FIG. 12 comprises three units: the image reading unit 101, an image engine control unit 1200, and the image writing unit 104. Each of the units can be managed with a discrete PC board, respectively.

The image reading unit 101 comprises a CCD 1201, an A/D conversion module 1202, and a gain control module 1203, and converts optically read-out image information to digital image signals.

The image engine control unit 1200 is formed mainly with the system controller 231, the process controller 211, and the memory module 222 in the image memory control unit 102. Further, the image processor 204, the image-memory access control section 221, and the image data control section 203 for controlling the bus are handled as a grouping of units.

The image writing unit 104 comprises the video data control section 205 as a main unit, and the image formation unit 206.

Based on the configuration of these units, when specifications or performance capabilities of the image reading unit 101 are altered, data interface can be retained by changing only the image reading unit 101 in the system of the digital multifunction machine. Thus, there is no need to make a change to any other units. When the image formation unit (engine) 206 is altered, reconstruction of the system is possible by changing only the image writing unit 104.

As explained above, in the case of the units depending on the input/output devices, the system is constructed with the units which have different configurations. Therefore, the system can be upgraded only through minimum-unit replacements on condition that the data interface is retained.

When the printer as a discrete device shown in FIG. 13 uses the image formation unit (engine) 206 the same as that of the digital multifunction machine, the image writing unit 104 can be shared with the digital multifunction machine.

When the image processing apparatus is used as a discrete printer, there is no need to provide the image reading unit 101. Accordingly, the image reading unit 101 is removed from the system configuration of the digital multifunction machine. The image engine control unit 1200 can perform its function even if the unit is commonly used with the digital multifunction machine, but the function will be beyond the specs. Further, there is no need to provide the image processor 204. Therefore, any controller most suitable to the system is formed on a different board to enable cost optimization.

In the image engine control unit 1200 shown in FIG. 12, respective modules (components) of the image processor 204, the image data control section 203 and the image-memory access control section 221 are formed with independent modules. Accordingly, a change in usage from the image engine control unit 1200 to a controller is made by removing any unnecessary modules, so that the common modules are used for a general purpose. As explained above, the module for image engine control and the module for a controller are not produced discretely, but the same function can be performed by using the common module between the two.

[Contents of Image Processing]

Figures 14, 15:
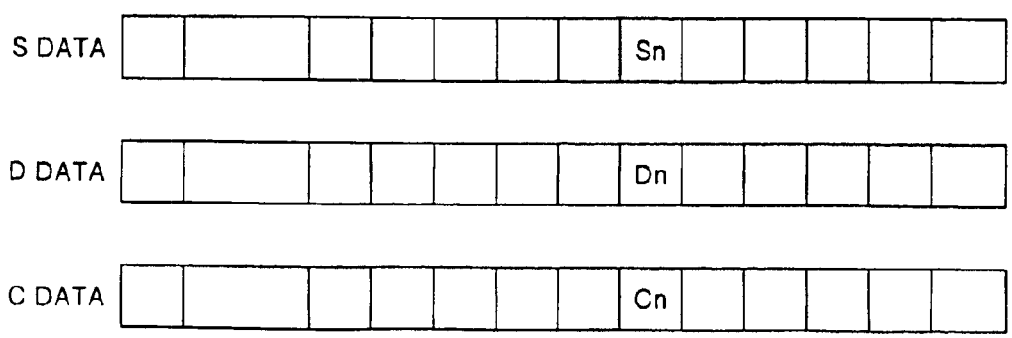
FIG. 14 schematically shows a scanner (an example of a spatial filter) in the image processing apparatus according to the embodiment.
FIG. 15 schematically shows shading correction in the image processing apparatus according to the embodiment.

Contents of the image processing of the image processing apparatus according to the embodiment is explained below. FIG. 14 schematically shows a scanner (an example of a spatial filter) of the image processing apparatus according to the embodiment. The function of MTF correction is performed based on the structure of the spatial filter.

As shown in FIG. 14, when the two-dimensional spatial filter is structured with filter factors of A to Y, filtering is executed on all of images for input image data with the same computing operation.

When spatial filtering is to be performed around the input image data (row i, column j), for example, respective images, in row i and column j are subjected to computation with the corresponding factors. The pixel (i, j) is computed with the factor value M, and the pixel (i, j+1) is computed with a factor value N, respectively. The result of calculation within a filter matrix is output as the result of processing for a remarked pixel (i, j).

When the remarked pixel is (i, j+1), the pixel (i, j+1) is computed with the factor value M, and the pixel (i, j+2) is computed with the factor value N. Thus, the result of calculation within the filter matrix is output as the result of processing for the remarked pixel (i, j+1).

The processing is executed based on different input image data but common parameters for processing. In this spatial filter processing, the factor values A to Y are not fixed, but can arbitrarily be changed according to characteristics of an input image and desired image quality. Further, there maybe a case where flexibility of the image processing function can not be ensured unless a change can be made to the values.

In the image processor 204, even if the factor value is downloaded from the process controller, the configuration of the scanning unit is altered, and characteristics of degradation in the scanned image are changed, changes of the system can be followed by changing the contents of data to be loaded.

Figure 16:
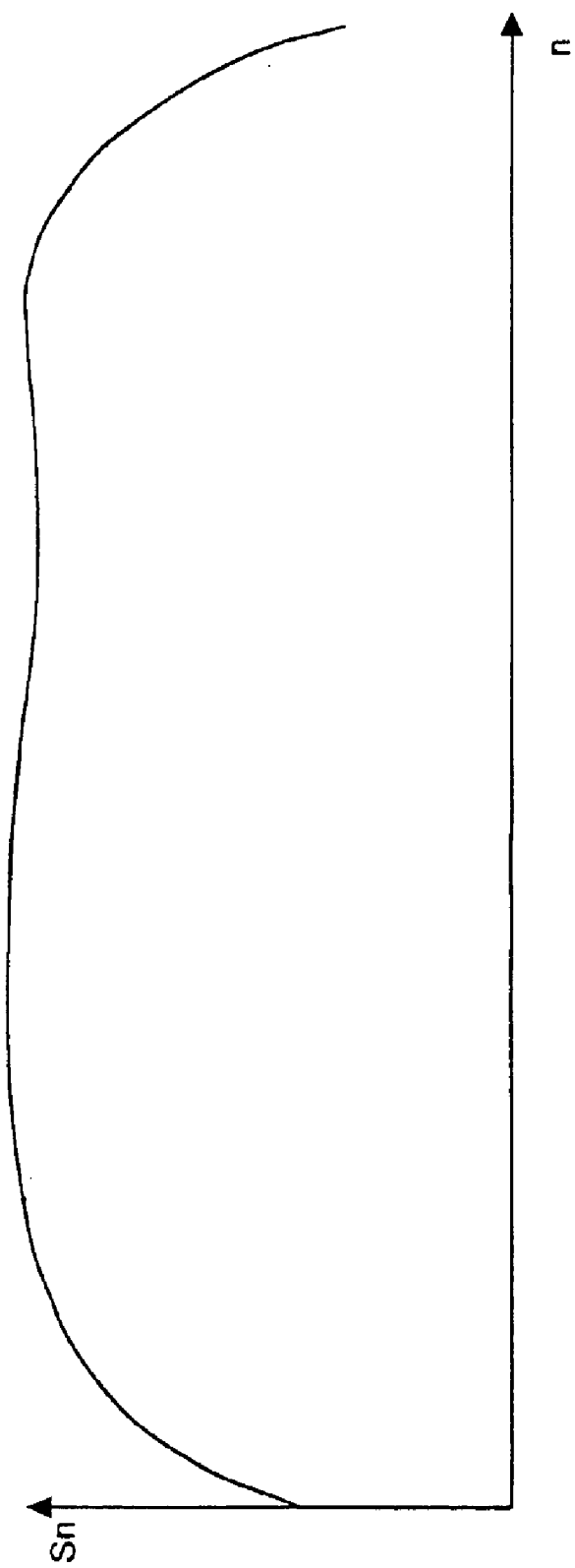
FIG. 16 schematically shows shading data in the image processing apparatus according to the embodiment.

FIG. 15 schematically shows shading correction in the image processing apparatus according to the embodiment. FIG. 16 schematically shows data for shading in the image processing apparatus according to the embodiment.

The shading correction is the processing for correcting nonuniformity in reflection light characteristics based on a illumination distribution of an illumination system. A reference white plate with uniform density is scanned before scanning a document, reference data for shading correction is generated, and a reflection distribution depending on scanned positions of the image is normalized.

As shown in FIG. 16, the reflection distribution of the data for shading is different due to a position n where the document is scanned. The uniform-density white plate is scanned at a dark level at the edge of the document scanned position. Sn represents a signal level when the white plate is scanned at a data read-out position n, and a higher value in Sn indicates that the white plate is scanned at a brighter level.

The shading correction is the processing for correcting variations in a light-amount distribution of a lamp by executing the processing with the same contents on each scanned image data for the data dependent on positions. The data S shown in FIG. 15 is the data for shading generated by scanning the white plate shown in FIG. 15.

The data D shown in FIG. 15 is scanned image data for each line to be scanned, and n represents a position where data is scanned. The data C is data after shading processing is executed on data D, and the data is normalized by the following equation.

$$Cn = A (Dn/Sn)$$

Where A is a factor of normalization.

The image processor 204 stores the data S in the group of bus switches/local memories 502, and performs computing for correction between Dn and Sn corresponding to the input data D.

[Data Flow]

Figure 17:
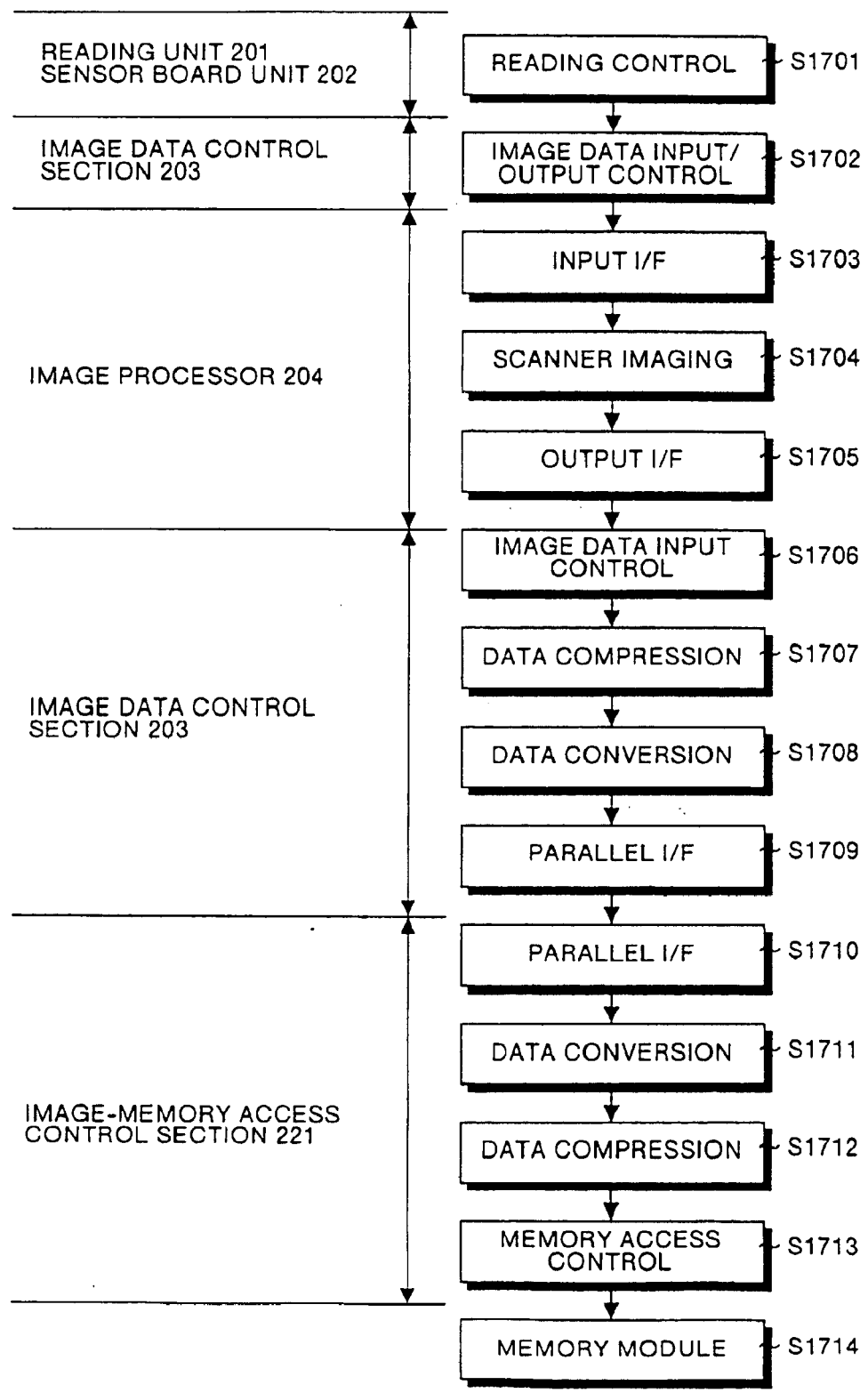
FIG. 17 shows an example of a data flow of image data in the image processing apparatus according to the embodiment.
Figure 18:
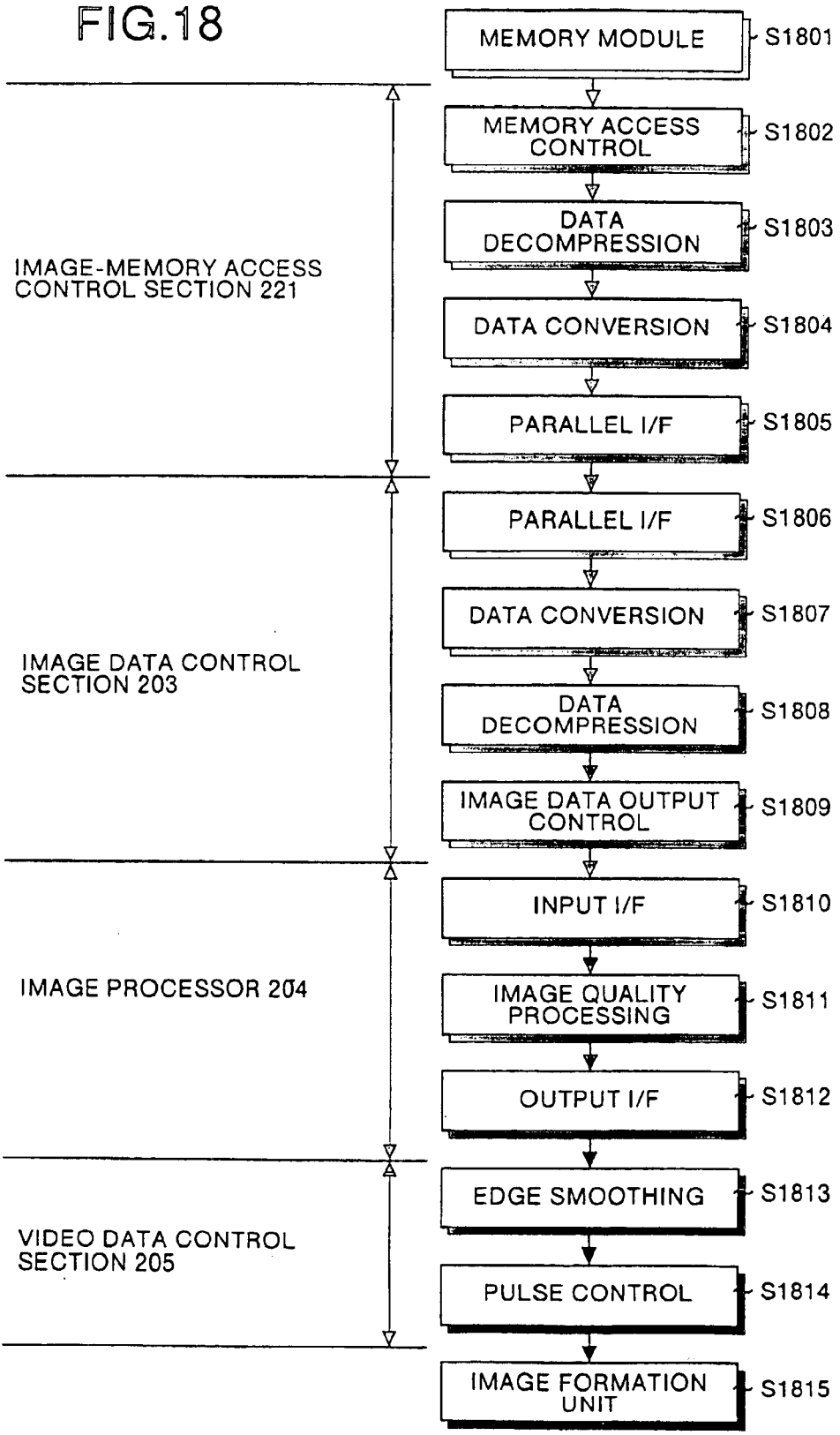
FIG. 18 shows another example of the data flow of image data in the image processing apparatus according to the embodiment.

Processing for accumulating images in the memory module 222 is explained below. FIG. 17 and FIG. 18 show data flows of the image processing apparatus as a digital multifunction machine with the processing for accumulating images in the memory module 222 according to the embodiment.

FIG. 17 shows a flow from the scanning unit 201 to the memory module 222, and FIG. 18 shows a flow from the memory module 222 to the image formation unit 206. Each of the processing is executed by controlling the data flow between the buses and units under the control of the image data control section 203.

As shown in FIG. 17, the scanning unit 201 and the sensor board unit 202 provide controls for scanning (step S1701). The image data control section 203 performs input processing of image data and provides controls for its output (step S1702). The image processor 204 performs processing for input I/F control (step S1703), the scanner imaging (step S1704), and output I/F processing (step S1705).

The image data control section 203 performs again the processing for inputting image data (step S1706), data compression (step S1707) and data conversion (step S1708), and then performs the processing for parallel I/F controls (step S1709).

The image-memory access control section 221 provides controls for the parallel I/F (step S1710), performs data conversion (step S1711) and further data compression (step S1712), and provides controls for access to the memory module 222 (step S1713). Accordingly, the image data is stored in the memory module 222 (step S1714).

As shown in FIG. 18, the image-memory access control section 221 provides controls for access (step S1802) to the image data stored in the memory module 222 (step S1801), performs data decompression (step S1803) and data conversion (step S1804), and provides controls for the parallel I/F (step S1805).

The image data control section 203 provides controls for the parallel I/F (step S1806), performs data conversion (step S1807) and data decompression (step S1808), and then provides of output controls for the image data (step S1809).

The image processor 204 provides controls for the input I/F (step S1810), performs the processing for image quality on the data (step S1811), and provides controls for the output I/F (step S1812).

The video data control section 205 performs edge smoothing on the image data (step S1813) and provides pulse controls (step S1814), and the image formation unit 206 executes the processing for image formation (step S1815).

The scanner imaging is executed on the scanned image data and the processing for image quality is executed on the image data to be output to the image formation unit 206, and both of the processing are discretely performed in the image processor 204.

The scanner imaging and the image-quality processing are concurrently operable. The scanned image is provided for facsimile transmission, and at the same time, the image data previously accumulated in the memory module 222 can be output onto the transfer paper while changing the contents of the image-quality processing.

Figure 19:
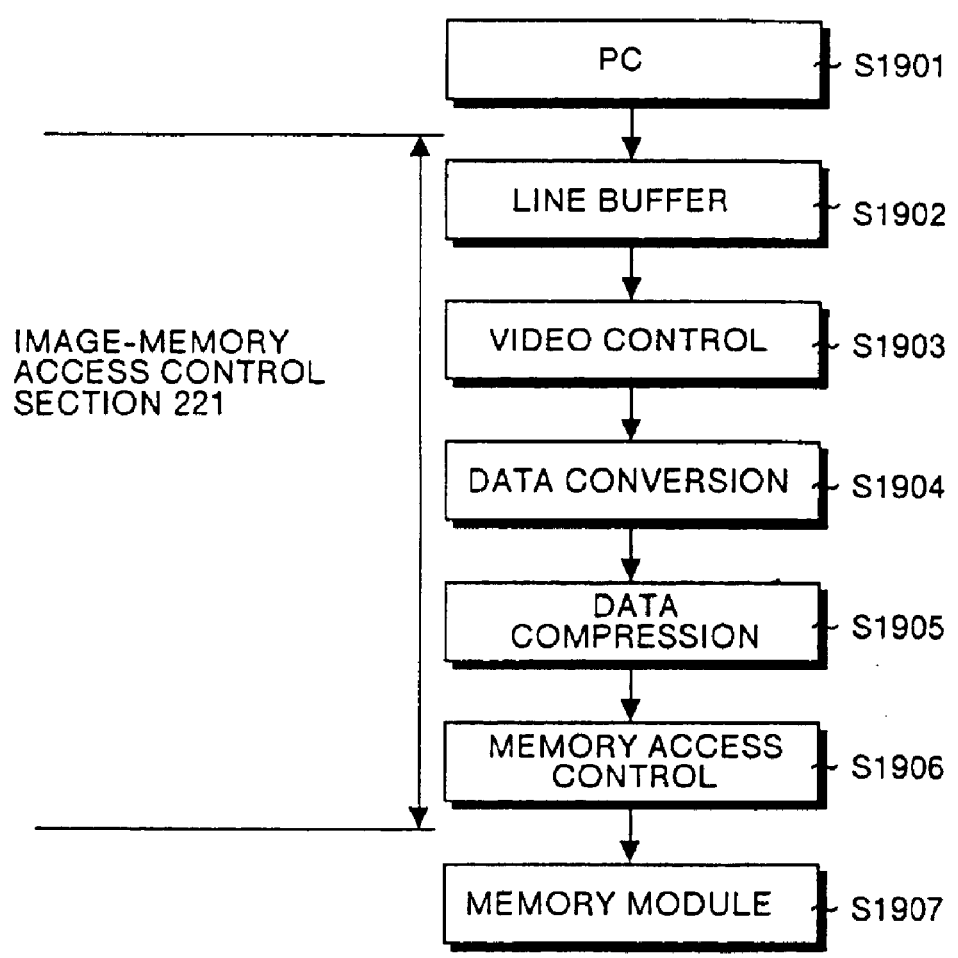
FIG. 19 shows another example of the data flow of image data in the image processing apparatus according to the embodiment.
Figure 20:
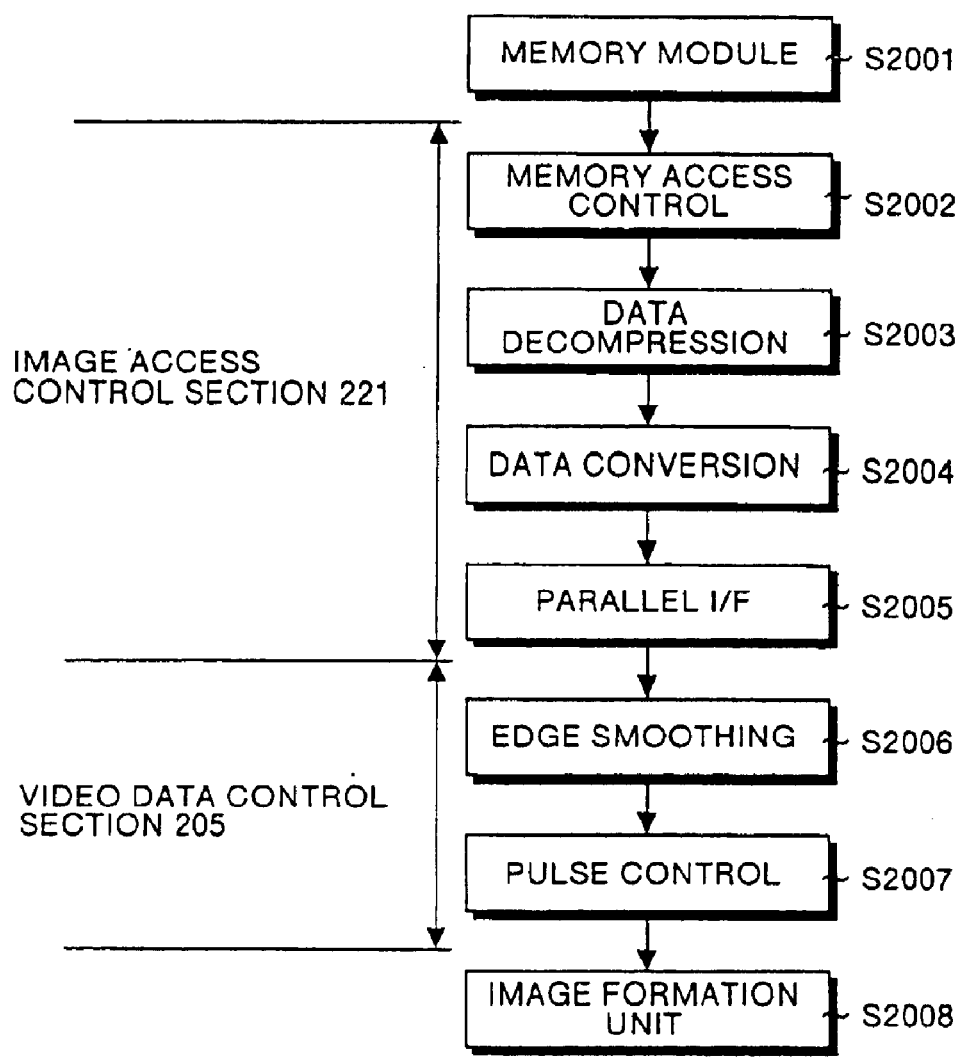
FIG. 20 shows another example of the data flow of image data in the image processing apparatus according to the embodiment.

FIG. 19 and FIG. 20 show the data flows of the image processing apparatus as a discrete printer with the processing for accumulating images in the memory module 222 according to the embodiment. FIG. 19 shows the flow from the PC 223 to the memory module 222, and FIG. 20 shows the flow from the memory module 222 to the image formation unit 206.

As shown in FIG. 19, the PC 223 outputs the image data (step S1901), and the image-memory access control section 221 retains the image data in the line buffer 1104 (step S1902), provides video controls (step S1903), data conversion (step S1904) and data compression (step S1905), and then provides controls for access to the memory module 222 (step S1906). Accordingly, the image data is stored in the memory module 222.

In FIG. 20, the image-memory access control section 0.221 provides controls for access (step S2002) to the image data stored in the memory module 222 (step S2001), performs data decompression (step S2003) and data conversion (step S2004), and provides controls for the parallel I/F (step S2005).

The video data control section 205 performs edge smoothing on the image data (step S2006) and provides pulse controls (step S2007), and the image formation unit 206 executes the processing for image formation (step S2008).

As explained above, the coded data sent from the PC 223 is converted to image data, and once the image data is accumulated in the memory module 222, data decompression is performed only once even if a plurality of copies are to be output. Thus, printing performance is improved as compared to the controller that performs data decompression every time.

As for the image data read-out from the memory module 222, a reproduction image with a plurality of variations for one image can be formed on transfer paper by changing the contents of the post-processing executed in the video data control section 205. Further, there is no need to decompress the coded data to image data each time the parameters of edge smoothing and pulse controls in the video data control section 205 are altered.

[Configuration of Facsimile Control Unit 224]

A functional configuration of the facsimile control unit 224 is explained below. FIG. 21 is a block diagram showing a configuration of the facsimile control unit 224 in the image processing apparatus according to the embodiment.

As shown in the block diagram of FIG. 21, the facsimile control unit 224 comprises a facsimile transmission/reception section 2101 and an external I/F 2102. The facsimile transmission/reception section 2101 converts the image data to its communication format, transmits the data to an external network, and restores the data received from the outside to the image data, and the image formation unit 206 prints out the data via the external I/F 2102 and the parallel bus 220.

The facsimile transmission/reception section 2101 comprises a facsimile imaging section 2103, an image memory 2104, a memory control section 2105, a data control section 2106, an image compression/decompression section 2107, a modem 2108, and a network control device 2109.

As for the facsimile imaging of the above processing, the processing for binary smoothing is executed on the received image in the edge smoothing section 1001 of the video data control section 205 shown in FIG. 10. The function of the output buffer in the image memory 2104 is partially shifted to the image-memory access control section 221 and the memory module 222.

In the facsimile transmission/reception section 2101 configured as explained above, when transmission of the image data is started, the data control section 2106 issues an instruction to the memory control section 2105 to successively read out the accumulated image data from the image memory 2104. The read-out image data is restored to original signals by the facsimile imaging section 2103, the processing for density conversion and scaling are executed on the signals, and the image data is added to the data control section 2106.

The image data added to the data control section 2106 is code-compressed by the image compression/decompression section 2107, and demodulated in the modem 2108, and then the demodulated data is sent to the target for transfer via the network control device 2109. The image information that has been transmitted is deleted from the image memory 2104.

Reception images are accumulated once in the image memory 2104 on their reception. If the situation allows reception images to be printed out during accumulation, an image is printed out at the point of time when the image for one sheet is completely received. When reception is started in response to being called during copying, images are accumulated in the image memory 2104 until the percentage of using the image memory 2104 reaches a predetermined value, 80%, for example. When the percentage of using the image memory 2104 has reached 80%, the writing operation executed at that time is terminated, and the reception image is read out from the image memory 2104 to be printed out.

The reception image read-out from the image memory 2104 is then deleted from the image memory 2104. When the percentage of using the image memory 2104 has been decreased to a predetermined value, 10%, for example, the terminated writing operation is restarted, and when all the writing operation is finished, the remaining part of the reception image is printed out. Various types of parameters for the writing operation are internally saved during its termination so that the writing operation can be restarted after its termination is released. At the time of restarting, the parameters are internally recovered.

[Configuration of SIMD type of processor]

FIG. 22 schematically shows a configuration of an SIMD type of processor. SIMD (Single Instruction stream Multiple Data stream) allows the processor to concurrently execute a single instruction on a plurality pieces of data. Accordingly, the processor comprises a plurality of PEs (processor elements).

Each of the PEs comprises a register (Reg) 2201 that stores data, a multiplexer (MUX) 2202 that gets access to any register of another PE, a barrel shifter (Shift Expand) 2203, an arithmetic logic unit (ALU) 2204, an accumulator (A) 2205 that stores logical results, and a temporary register (F) 2206 that temporarily compares the contents of the accumulator to each other.

Each of the registers 2201 is connected to an address bus and a data bus (a lead and a word line), and stores an instruction Ad code to define processing and data as an object for processing. The contents of the register 2201 is input into the arithmetic logic unit 2204, and the result of arithmetic is stored in the accumulator 2205.

In order to take out the result to the outside of the PE, the result is saved once in the temporary register 2206. The result of the processing for the target data can be obtained by fetching the contents of the temporary register 2206.

An instruction code with the same contents is provided to the respective PEs, and the target data for processing is provided to each PE in its different state. The result of arithmetic is subjected to parallel processing by referring to the contents of registers 2201 in adjacent PES in the multiplexer 2202, and the result is output to each accumulator 2205.

For example, if the contents of one line in the image data is provided in PE for each pixel and the contents are calculated with the same instruction code, the result of processing for one line can be obtained within a shorter period of time as compared to sequential processing for each pixel. Especially, for the processing of spatial filtering and shading correction, an operation equation itself is used as an instruction code for each PE, so that the processing common to all the PEs can be executed.

The method for image processing explained in this embodiment can be realized by making a computer such as a personal computer or a work station execute a previously prepared program. This program is recorded in a computer-readable recording medium such as a hard disk, a floppy disk, a CD-ROM, MO, and a DVD, and the program is read out from the recording medium by the computer to be executed. Further, this program can be distributed via the recording medium and a network such as the Internet, and can also be transferred as a transmission medium.

According to one aspect of this invention, during idle cycle time that the image processing section does not execute image processing, the transfer control section splits a sequence of image processing and data for image processing to be added or updated into blocks for a plurality of transfer times, and transfers the blocks from the third storage section to the second storage section. Therefore, alteration of and addition to the program can immediately and efficiently be executed as required without interruption of the primary operation of the image processing apparatus. Thus, the image processing apparatus with high efficiency and availability can be obtained.

Further, during the idle cycle time that the image processing section does not execute image processing, the transfer control section splits the sequence of image processing and data for image processing to be added or updated into blocks for a plurality of transfer times each by a predetermined number of pieces of data to be transferred for one time, and transfers the blocks from the third storage section to the second storage section. Therefore, alteration of and addition to the program can immediately and efficiently be executed as required without interruption of the primary operation of the image processing apparatus. Thus, the image processing apparatus with high efficiency and availability can be obtained.

Further, a set value of the predetermined number of pieces of data to be transferred for one time is included in data downloaded from the external microprocessor into the third storage section, and is set according to the length of idle cycle time determined based on the ability of the image processing section to perform image processing. Therefore, the sequence of image processing and data for image processing to be added or updated can efficiently be transferred from the third storage section to the second storage section under optimal transfer conditions suitable for the ability of the image processing section to perform image processing. Further, such transfer can be executed without interruption of the primary operation of the image processing apparatus. Thus, the image processing apparatus with high efficiency and availability can be obtained.

Further, the image processing unit is formed with the SIMD type of processor to perform image processing based on a high-speed computation of the SIMD type of processor. Therefore, respective resources in the system can be made effective use of when a multiple function is performed. Thus, the image processing apparatus that can provide most adequate controls for the overall system can be obtained.

According to another aspect of this invention, the sequence of image processing and data for image processing to be added or updated are split into blocks for a plurality of transfer times, and the blocks are transferred from a third storage section to a second storage section during idle cycle time that the image processing section does not execute image processing. Therefore, an image processing apparatus can immediately and efficiently execute alteration of and addition to the program as required without interruption of the primary operation of the image processing apparatus. Thus, the method of adding or updating the sequence of image processing and the data for image processing in the image processing apparatus with such functions can be obtained.

Further, the sequence of image processing and data for image processing to be added or updated are split into blocks for a plurality of transfer times each by a predetermined number of pieces of data to be transferred for one time, and the blocks are transferred from the third storage section to the second storage section during idle cycle time that the image processing section does not execute image processing. Therefore, an image processing apparatus can immediately and efficiently execute alteration of and addition to the program as required without interruption of the primary operation of the image processing apparatus. Thus, the method of adding or updating the sequence of image processing and the data for image processing in the image processing apparatus with such functions can be obtained.

Further, a set value of the predetermined number of pieces of data to be transferred for one time is included in data downloaded from the external microprocessor into the third storage section, and is set according to the length of idle cycle time determined based on the ability of the image processing section to perform image processing. Therefore, an image processing apparatus can efficiently transfer the sequence of image processing and data for image processing to be added or updated from the third storage section to the second storage section under optimal transfer conditions suitable for the ability of the image processing section to perform image processing. Further, such transfer can be executed without interruption of the primary operation of the image processing apparatus. Thus, the method for adding or updating the sequence of image processing and the data for image processing in the image processing apparatus with such functions can be obtained.

According to still another aspect of this invention, a program which makes a computer execute the method according to the invention is recorded in a recording medium, which allows the program to be machine-readable. Accordingly, it is possible to obtain the recording medium with which the method according to the invention can be executed by a computer.

The present document incorporated by reference the entire contents of Japanese priority document, 11-248307 filed in Japan on Sep. 2, 1999.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
   an input unit which converts read-in image data to digitized image signals or image information generated as digital information to image signals;
   an output unit which can output the digitized image signals as a printed image; and
   a programmable image processing unit which subjects the digitized image signals to image processing,
   wherein said image processing unit comprises:
   a first storage section which stores image data for an object to be image-processed;
   a second storage section in which a sequence of image processing and data for image processing are rewritably written;
   an image processing section which grabs image data for an object to be image-processed from said first storage section, and performs data processing by referring to the sequence of image processing and the data for image processing written in the second storage section;
   a third storage section which temporarily stores a sequence of image processing and data for image processing to be added or updated, that are transferred from an external microprocessor; and
   a transfer control section which transfers the sequence of image processing and data for image processing to be added or updated from said third storage section to said second storage section during idle cycle time that said image processing section does not execute image processing, and
   said transfer control section provides controls for transfer so as to split the sequence of image processing and data for image processing to be added or updated into blocks for a plurality of transfer times and transfer the blocks from said third storage section to said second storage section.

2. The image processing apparatus according to claim 1, wherein said image processing unit is formed with an SIMD (Single Instruction stream Multiple Data stream) type of processor.

3. The image processing apparatus according to claim 1, wherein said transfer control section provides controls for transfer so as to split the sequence of image processing and data for image processing to be added or updated into blocks for a plurality of transfer times, each by a predetermined number of pieces of data to be transferred for one time, and transfer the blocks from said third storage section to said second storage section.

4. The image processing apparatus according to claim 3, wherein said image processing unit is formed with an SIMD (Single Instruction stream Multiple Data stream) type of processor.

5. The image processing apparatus according to claim 3, wherein a set value of the predetermined number of pieces of data to be transferred for one time is included in data downloaded from said external microprocessor into said third storage section, and is set according to the length of idle cycle time determined based on the ability of said image processing section to perform image processing.

6. The image processing apparatus according to claim 5, wherein said image processing unit is formed with an SIMD (Single Instruction stream Multiple Data stream) type of processor.

7. A method for adding or updating a sequence of image processing and data for image processing in an image processing apparatus comprising:
   an input unit which converts read-in image data to digitized image signals or image information generated as digital information to image signals;
   an output unit which can output the digitized image signals as a printed image; and
   a programmable image processing unit which subjects the digitized image signals to image processing, and said image processing unit comprising:
   a first storage section which stores image data for an object to be image-processed;
   a second storage section in which a sequence of image processing and data for image processing are rewritably written;
   an image processing section which grabs image data for an object to be image-processed from said first storage section, and performs data processing by referring to the sequence of image processing and the data for image processing written in the second storage section;
   a third storage section which temporarily stores the sequence of image processing and data for image processing to be added or updated, that are transferred by an external microprocessor; and
   a transfer control section which transfers the sequence of image processing and data for image processing to be added or updated from said third storage section to said second storage section during idle cycle time that said image processing section does not execute image processing,
   wherein the sequence of image processing and data for image processing to be added or updated are split into blocks for a plurality of transfer times, and the blocks are transferred from said third storage section to said second storage section.

8. The method for adding or updating a sequence of image processing and data for image processing in an image processing apparatus according to claim 7, wherein the sequence of image processing and data for image processing to be added or updated are split into blocks for a plurality of transfer times each by a predetermined number of pieces of data to be transferred for one time, and the blocks are transferred from said third storage section to said second storage section.

9. The method for adding or updating a sequence of image processing and data for image processing in the image processing apparatus according to claim 8, wherein a set value of the predetermined number of pieces of data to be transferred for one time is included in data downloaded from said external microprocessor into said third storage section, and is set according to the length of idle cycle time determined based on the ability of said image processing section to perform image processing.

10. A computer-readable recording medium in which a program for making a computer execute the method for adding or updating a sequence of image processing and data for image processing in an image processing apparatus comprising:

an input unit which converts read-in image data to digitized image signals or image information generated as digital information to image signals;

an output unit which can output the digitized image signals as a printed image; and a programmable image processing unit which subjects the digitized image signals to image processing, and said image processing unit comprising:

a first storage section which stores image data for an object to be image-processed;

a second storage section in which a sequence of image processing and data for image processing are rewritably written;

an image processing section which grabs image data for an object to be image-processed from said first storage section, and performs data processing by referring to the sequence of image processing and the data for image processing written in the second storage section;

a third storage section which temporarily stores the sequence of image processing and data for image processing to be added or updated, that are transferred by an external microprocessor; and a transfer control section which transfers the sequence of image processing and data for image processing to be added or updated from said third storage section to said second storage section during idle cycle time that said image processing section does not execute image processing, wherein the sequence of image processing and data for image processing to be added or updated are split into blocks for a plurality of transfer times, and the blocks are transferred from said third storage section to said second storage section.

11. A computer-readable recording medium in which a program for making a computer execute the method for adding or updating a sequence of image processing and data for image processing in an image processing apparatus comprising:

an input unit which converts read-in image data to digitized image signals or image information generated as digital information to image signals;

an output unit which can output the digitized image signals as a printed image; and a programmable image processing unit which subjects the digitized image signals to image processing, and said image processing unit comprising:

a first storage section which stores image data for an object to be image-processed;

a second storage section in which a sequence of image processing and data for image-processing are rewritably written;

an image processing section which grabs image data for an object to be image-processed from said first storage section, and performs data processing by referring to the sequence of image processing and the data for image processing written in the second storage section;

a third storage section which temporarily stores the sequence of image processing and data for image processing to be added or updated, that are transferred by an external microprocessor; and a transfer control section which transfers the sequence of image processing and data for image processing to be added or updated from said third storage section to said second storage section during idle cycle time that said image processing section does not execute image processing, wherein the sequence of image processing and data for image processing to be added or updated are split into blocks for a plurality of transfer times, and the blocks are transferred from said third storage section to said second storage section; and wherein the sequence of image processing and data for image processing to be added or updated are split into blocks for a plurality of transfer times each by a predetermined number of pieces of data to be transferred for one time, and the blocks are transferred from said third storage section to said second storage section.

12. A computer-readable recording medium in which a program for making a computer execute the method for adding or updating a sequence of image processing and data for image processing in an image processing apparatus comprising:

an input unit which converts read-in image data to digitized image signals or image information generated as digital information to image signals;

an output unit which can output the digitized image signals as a printed image; and a programmable image processing unit which subjects digitized image signals to image processing, and said image processing unit comprising:

a first storage section which stores image data for an object to be image-processed;

a second storage section in which a sequence of image processing and data for image processing are rewritably written;

an image processing section which grabs image data for an object to be image-processed from said first storage section, and performs data processing by referring to the sequence of image processing and the data for image processing written in the second storage section;

a third storage section which temporarily stores the sequence of image processing and data for image processing to be added or updated, that are transferred by an external microprocessor; and a transfer control section which transfers the sequence of image processing and data for image processing to be added or updated from said third storage section to said second storage during idle cycle time that said image processing section does not executed miage processing, wherein the sequence of image processing and data for image processing to be added or updated are split into blocks for a plurality of transfer times, and the blocks are transferred from said third storage section to said second storage section;

wherein the sequence of image processing and data for image processing to be added or updated are split into blocks for a plurality of transfer times each by a predetermined number of pieces of data to be transferred for one time, and the blocks are transferred from said third storage section to said second storage section; and wherein a set value of the predetermined number of pieces of data to be transferred for one time is included in data downloaded from said external microprocessor into said third storage section, and is set according to the length of idle cycle time determined based on the ability of said image processing section to perform image processing.

13. An image processing apparatus comprising:

a programmable image processing unit which subjects the digitized image signals to image processing, wherein said image processing unit comprises:

a first storage section which stores image data for an object to be image-processed;

a second storage section in which a sequence of image processing and data for image processing are rewritably written;

an image processing section which grabs image data for an object to be image-processed from said first storage section, and performs data processing by referring to the sequence of image processing and the data for image processing written in the second storage section;

a third storage section which temporarily stores a sequence of image processing and data for image processing to be added or updated, that are transferred from an external microprocessor; and a transfer control section which transfers the sequence of image processing and data for image processing to be added or updated from said third storage section to said second storage section during idle cycle time that said image processing section does not execute image processing, and said transfer control section provides controls for transfer so as to split the sequence of image processing and data for image processing to be added or updated into blocks for a plurality of transfer times and transfer the blocks from said third storage section to said second storage section.

14. A processing apparatus for renewing programs and data comprising:

a programmable processing unit which subjects the digitized signals to processing, wherein said programmable processing unit comprises:

a first storage section which stores data for an object to be processed;

a second storage section in which a sequence of processing and data for processing are rewritably written;

a processing section which grabs data for an object to be processed from said first storage section, and performs data processing by referring to the sequence of processing and the data for processing written in the second storage section;

a third storage section which temporarily stores a sequence of processing and data for processing to be added or updated, that are transferred from an external microprocessor; and a transfer control section which transfers the sequence of processing and data for processing to be added or updated from said third storage section to said second storage section during idle cycle time that said processing section does not execute processing, and said transfer control section provides controls for transfer so as to split the sequence of processing and data for processing to be added or updated into blocks for a plurality of transfer times and transfer the blocks from said third storage section to said second storage section.

* * * * *